United States Patent
Antonic

(10) Patent No.: US 8,065,841 B2
(45) Date of Patent: Nov. 29, 2011

(54) ROOF PANEL SYSTEMS FOR BUILDING CONSTRUCTION

(76) Inventor: James P. Antonic, Ft. Myers, FL (US)

( * ) Notice: Subject to any disclaimer, the term of this patent is extended or adjusted under 35 U.S.C. 154(b) by 851 days.

(21) Appl. No.: 12/005,528

(22) Filed: Dec. 27, 2007

(65) Prior Publication Data

US 2008/0236058 A1    Oct. 2, 2008

Related U.S. Application Data

(60) Provisional application No. 60/877,963, filed on Dec. 29, 2006.

(51) Int. Cl.
*E04B 7/02* (2006.01)
(52) U.S. Cl. ....... 52/90.1; 52/173.3; 52/302.1; 52/795.1
(58) Field of Classification Search ............... 52/90.1, 52/73.3, 302.1, 302.3, 506.01, 795.1, 220.1, 52/220.5; 454/364–366
See application file for complete search history.

(56) References Cited

U.S. PATENT DOCUMENTS

| | | | |
|---|---|---|---|
| 1,085,429 A | 1/1914 | Kahn et al. |
| 1,609,541 A | 12/1926 | Gooding |
| 1,958,124 A | 7/1931 | Bemis |
| 1,854,396 A | * 4/1932 | Davis | 52/483.1 |
| 1,959,135 A | 5/1934 | Miller |
| 2,142,523 A | 1/1939 | McLaughlin, Jr. |
| 2,256,394 A | 9/1941 | Lamel |
| 2,380,834 A | 6/1942 | Goldman |
| 2,321,221 A | 6/1943 | Linehan |
| 2,356,309 A | 8/1944 | Garbe |
| 2,363,164 A | 11/1944 | Waller |
| 2,406,501 A | 8/1946 | Kratzmaier |
| 2,567,586 A | 9/1951 | Worder |
| 2,731,116 A | 1/1956 | Hamilton |
| 3,152,672 A | 10/1964 | Oppenhuizen |
| 3,184,013 A | 5/1965 | Pavlecka |
| 3,310,926 A | 3/1967 | Brandreth |
| 3,332,188 A | 7/1967 | Schaefer |
| 3,363,371 A | 1/1968 | Villalobos |
| 3,413,773 A | 12/1968 | Fitzgerald |
| 3,498,014 A | 3/1970 | Fergen |
| 3,533,205 A | 10/1970 | Pestel et al. |

(Continued)

FOREIGN PATENT DOCUMENTS

FR    2871823    12/2005

(Continued)

OTHER PUBLICATIONS

PCT written opinion/Notification of written opinion for corresponding PCT application (SN PCT/US2007/026401) to U.S. Appl. No. 12/005,528, date of notification Jul. 9, 2009 and date of written opinion Jun. 12, 2008, relevant pages (6 pages).

(Continued)

*Primary Examiner* — Brian Glessner
*Assistant Examiner* — Adam Barlow
(74) *Attorney, Agent, or Firm* — Laura G. Barrow

(57) ABSTRACT

Roof panels and roof panel assemblies, comprising roof panels and ridge beams, assemblies are disclosed for use in building construction. The roof panels and ridge beams comprise components formed of composite materials, and certain aspects of the invention include designs that provide for the absorption of solar heat and the promotion of hot air flow within the roof to heat the interior building or generate electricity, among other attributes.

16 Claims, 20 Drawing Sheets

U.S. PATENT DOCUMENTS

| | | | |
|---|---|---|---|
| 3,562,970 A | 2/1971 | Schwartz | |
| 3,593,475 A | 7/1971 | LaGue | |
| 3,623,290 A | 11/1971 | Downing, Jr. | |
| 3,630,474 A | 12/1971 | Minor | |
| 3,685,222 A | 8/1972 | Curtess | |
| 3,744,199 A | 7/1973 | Navarre | |
| 3,821,868 A | 7/1974 | Edwards | |
| 3,877,194 A | 4/1975 | Matuschek et al. | |
| 3,989,399 A | 11/1976 | Slowbe | |
| 4,006,856 A * | 2/1977 | Nilsson | 126/591 |
| 4,047,355 A | 9/1977 | Knorr | |
| 4,107,893 A | 8/1978 | Rensch | |
| 4,124,186 A | 11/1978 | Call, Sr. | |
| 4,151,030 A | 4/1979 | Hensel | |
| 4,154,030 A | 5/1979 | Huguet | |
| 4,186,539 A | 2/1980 | Harmon et al. | |
| 4,199,908 A | 4/1980 | Teeters | |
| D256,663 S | 9/1980 | Gilb | |
| 4,235,054 A | 11/1980 | Cable | |
| 4,261,144 A | 4/1981 | Rizzo | |
| 4,272,930 A | 6/1981 | Foster | |
| 4,285,184 A | 8/1981 | Turner, Jr. | |
| 4,299,202 A * | 11/1981 | Mayo et al. | 126/649 |
| 4,324,082 A | 4/1982 | Rutkowski et al. | |
| 4,324,289 A * | 4/1982 | Lahti | 165/48.2 |
| 4,330,974 A | 5/1982 | Fleisch et al. | |
| 4,353,192 A * | 10/1982 | Pearson et al. | 52/281 |
| 4,370,838 A | 2/1983 | Vermillion | |
| D268,288 S | 3/1983 | Cowdroy | |
| 4,408,596 A * | 10/1983 | Worf | 126/630 |
| 4,430,832 A | 2/1984 | Kaiser et al. | |
| 4,530,194 A | 7/1985 | Linton et al. | |
| 4,542,614 A | 9/1985 | Malachowski | |
| D283,352 S | 4/1986 | Bancroft | |
| 4,612,744 A | 9/1986 | Shamash | |
| D286,199 S | 10/1986 | Bancroft | |
| 4,625,415 A | 12/1986 | Diamontis | |
| 4,630,547 A | 12/1986 | Przybylinski et al. | |
| 4,638,606 A | 1/1987 | Wendt | |
| 4,660,339 A | 4/1987 | Paz | |
| 4,689,930 A | 9/1987 | Menchetti | |
| 4,714,372 A | 12/1987 | Commins | |
| 4,744,192 A | 5/1988 | Commins | |
| D297,502 S | 9/1988 | Archambeau | |
| 4,812,075 A | 3/1989 | Lavin, Sr. | |
| 4,986,052 A | 1/1991 | Nelson | |
| D318,130 S | 7/1991 | Abbestam et al. | |
| 5,069,263 A | 12/1991 | Edwards | |
| 5,070,667 A | 12/1991 | Schulte | |
| 5,081,813 A | 1/1992 | White | |
| 5,092,100 A | 3/1992 | Lambert et al. | |
| D330,432 S | 10/1992 | Weinerman | |
| D331,469 S | 12/1992 | McMarlin | |
| 5,260,525 A | 11/1993 | Morse | |
| D342,662 S | 12/1993 | Lavin, Sr. | |
| 5,307,603 A | 5/1994 | Chiodo | |
| 5,313,752 A | 5/1994 | Hatzinikolas | |
| 5,321,924 A | 6/1994 | Smolik | |
| D349,166 S | 7/1994 | Beard, Jr. | |
| 5,339,798 A | 8/1994 | Christian | |
| 5,375,384 A | 12/1994 | Wolfson | |
| 5,390,460 A | 2/1995 | Llorens | |
| 5,394,665 A | 3/1995 | Johnson | |
| 5,403,062 A | 4/1995 | Sjostedt et al. | |
| D358,755 S | 5/1995 | Davis | |
| 5,423,156 A | 6/1995 | Nellessen, Jr. | |
| D363,997 S | 11/1995 | Nomura | |
| D364,331 S | 11/1995 | Leek | |
| D371,208 S | 6/1996 | De Zen | |
| 5,524,401 A * | 6/1996 | Ishikawa et al. | 52/173.3 |
| D371,505 S | 7/1996 | Young | |
| 5,561,955 A | 10/1996 | Frobosilo et al. | |
| D377,598 S | 1/1997 | Beard, Jr. | |
| 5,592,794 A | 1/1997 | Tundaun | |
| D378,422 S | 3/1997 | Howe | |
| 5,611,173 A | 3/1997 | Headrick et al. | |
| 5,644,888 A | 7/1997 | Johnson | |
| D384,169 S | 9/1997 | Leonelli | |
| 5,664,388 A | 9/1997 | Chapman et al. | |
| 5,678,797 A | 10/1997 | Grogan | |
| 5,706,620 A | 1/1998 | De Zen | |
| 5,706,626 A | 1/1998 | Mueller | |
| 5,735,090 A | 4/1998 | Papke | |
| 5,755,064 A | 5/1998 | Meyer et al. | |
| 5,758,466 A | 6/1998 | Tucker | |
| 5,794,746 A | 8/1998 | Ketonen et al. | |
| 5,797,233 A | 8/1998 | Hascall | |
| 5,799,454 A | 9/1998 | Anderson | |
| 5,802,798 A | 9/1998 | Martens | |
| D400,080 S | 10/1998 | Beard, Jr. | |
| 5,837,363 A | 11/1998 | Colafati | |
| 5,848,512 A | 12/1998 | Conn | |
| 5,850,714 A | 12/1998 | Liem | |
| D407,828 S | 4/1999 | Hart | |
| 5,927,039 A | 7/1999 | De Boer | |
| 5,930,968 A | 8/1999 | Pullam | |
| 5,950,385 A | 9/1999 | Herren | |
| D417,737 S | 12/1999 | Stansfield | |
| 6,003,279 A | 12/1999 | Schneider | |
| 6,023,898 A | 2/2000 | Josey | |
| D423,690 S | 4/2000 | Grosfillex | |
| 6,067,769 A | 5/2000 | Hardy | |
| D428,162 S | 7/2000 | Eyring et al. | |
| 6,092,340 A | 7/2000 | Simmons | |
| D432,671 S | 10/2000 | Grosfillex | |
| 6,131,363 A * | 10/2000 | Phillips | 52/786.11 |
| 6,158,188 A | 12/2000 | Shahnazarian | |
| 6,216,395 B1 | 4/2001 | Kelly | |
| 6,223,494 B1 | 5/2001 | Bright | |
| D443,810 S | 6/2001 | Ausilio | |
| 6,242,685 B1 * | 6/2001 | Mizukami et al. | 136/244 |
| D445,921 S | 7/2001 | Eyring | |
| 6,256,960 B1 | 7/2001 | Babcock et al. | |
| 6,260,601 B1 | 7/2001 | Thomas | |
| D446,870 S | 8/2001 | Gardner | |
| 6,272,796 B1 | 8/2001 | Metzler | |
| 6,276,094 B1 | 8/2001 | Hays | |
| D447,574 S | 9/2001 | Fening | |
| D448,495 S | 9/2001 | Lamberts | |
| 6,298,612 B1 | 10/2001 | Adams | |
| 6,314,704 B1 | 11/2001 | Bryant | |
| D452,016 S | 12/2001 | Hall | |
| 6,336,298 B1 | 1/2002 | Chou | |
| 6,341,458 B1 | 1/2002 | Burt | |
| 6,401,412 B1 * | 6/2002 | Cooper | 52/302.1 |
| 6,415,580 B2 | 7/2002 | Ojala | |
| 6,427,403 B1 | 8/2002 | Tambakis | |
| 6,438,903 B1 | 8/2002 | Weiss | |
| D465,586 S | 11/2002 | Krieger | |
| D466,233 S | 11/2002 | Krieger | |
| 6,513,290 B2 | 2/2003 | Leek | |
| 6,519,911 B1 | 2/2003 | Sawada | |
| D473,123 S | 4/2003 | Anderson | |
| D473,955 S | 4/2003 | Gregori | |
| 6,553,731 B2 | 4/2003 | Hsueh | |
| D474,286 S | 5/2003 | Gregori | |
| D474,549 S | 5/2003 | Krieger | |
| 6,581,337 B1 | 6/2003 | Skov et al. | |
| 6,598,356 B1 * | 7/2003 | Sells | 52/90.1 |
| 6,625,945 B2 | 9/2003 | Commins | |
| 6,655,096 B1 | 12/2003 | Pryor | |
| 6,684,573 B2 | 2/2004 | Heath et al. | |
| 6,739,562 B2 | 5/2004 | Rice | |
| 6,754,999 B1 | 6/2004 | Urbanczyk | |
| D492,889 S | 7/2004 | Crainc | |
| 6,789,358 B2 | 9/2004 | Procton et al. | |
| 6,802,169 B2 | 10/2004 | Simmons | |
| 6,834,468 B1 | 12/2004 | Kroie | |
| D500,667 S | 1/2005 | Murphy et al. | |
| 6,837,012 B2 | 1/2005 | Scherrer et al. | |
| 6,837,019 B2 | 1/2005 | Collie | |
| 6,843,035 B1 | 1/2005 | Glynn | |
| 6,931,796 B2 | 8/2005 | Adriaansen et al. | |
| D511,086 S | 11/2005 | Craine | |
| D511,217 S | 11/2005 | Bullock et al. | |
| D523,565 S | 6/2006 | Antonic | |
| D523,735 S | 6/2006 | Craine | |

| | | |
|---|---|---|
| 7,086,204 B2 | 8/2006 | Salzer |
| D537,537 S | 2/2007 | Antonic |
| 7,178,305 B2 | 2/2007 | Petrova |
| D540,479 S | 4/2007 | Antonic |
| 7,207,148 B2 | 4/2007 | Surowiecki |
| D544,784 S | 6/2007 | Antonic |
| D549,851 S | 8/2007 | Antonic |
| D552,947 S | 10/2007 | Ewasiuk |
| D553,261 S | 10/2007 | Antonic |
| D553,761 S | 10/2007 | Antonic |
| D554,273 S | 10/2007 | Antonic |
| D554,773 S | 11/2007 | Antonic |
| D554,774 S | 11/2007 | Antonic |
| D554,775 S | 11/2007 | Antonic |
| D555,259 S | 11/2007 | Antonic |
| D555,467 S | 11/2007 | Pecoraro |
| D557,429 S | 12/2007 | Bullock |
| D561,353 S | 2/2008 | Antonic |
| D561,354 S | 2/2008 | Antonic |
| D561,355 S | 2/2008 | Antonic |
| 7,334,377 B2 | 2/2008 | Dubensky et al. |
| D574,518 S | 8/2008 | Antonic |
| D574,697 S | 8/2008 | Green |
| D581,253 S | 11/2008 | Antonic |
| D588,440 S | 3/2009 | Antonic |
| 7,513,082 B2 | 4/2009 | Johnson |
| D606,384 S | 12/2009 | Antonic |
| 2002/0066245 A1 | 6/2002 | Pryor |
| 2002/0069600 A1 | 6/2002 | Bryant |
| 2002/0092245 A1 | 7/2002 | Floyd et al. |
| 2002/0148178 A1 | 10/2002 | Farag |
| 2003/0029124 A1 | 2/2003 | Wise |
| 2003/0089066 A1 | 5/2003 | Nelson |
| 2003/0217521 A1 | 11/2003 | Richardson et al. |
| 2004/0068947 A1 | 4/2004 | Commins et al. |
| 2004/0107653 A1 | 6/2004 | Collie |
| 2004/0163355 A1 | 8/2004 | Collie |
| 2004/0227039 A1 | 11/2004 | Real et al. |
| 2005/0011157 A1 | 1/2005 | Lutz et al. |
| 2006/0026924 A1 | 2/2006 | Madsen |
| 2006/0156660 A1 | 7/2006 | Stateson |
| 2006/0207209 A1 | 9/2006 | Metroyanis |
| 2006/0254167 A1 | 11/2006 | Antonic |
| 2007/0094992 A1 | 5/2007 | Antonic |
| 2007/0193143 A1 | 8/2007 | Antonic |

FOREIGN PATENT DOCUMENTS

GB  507987 A  6/1939

OTHER PUBLICATIONS

European Search Report for EPO Application No. 07750810.9 (Mar. 3, 2010) (8 pages).

* cited by examiner

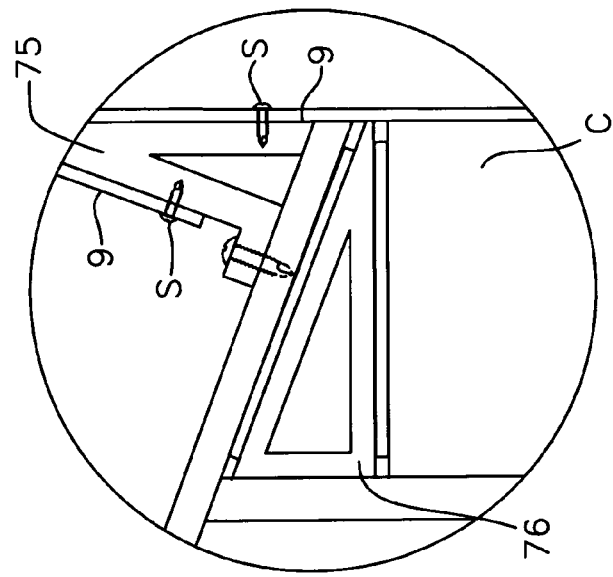
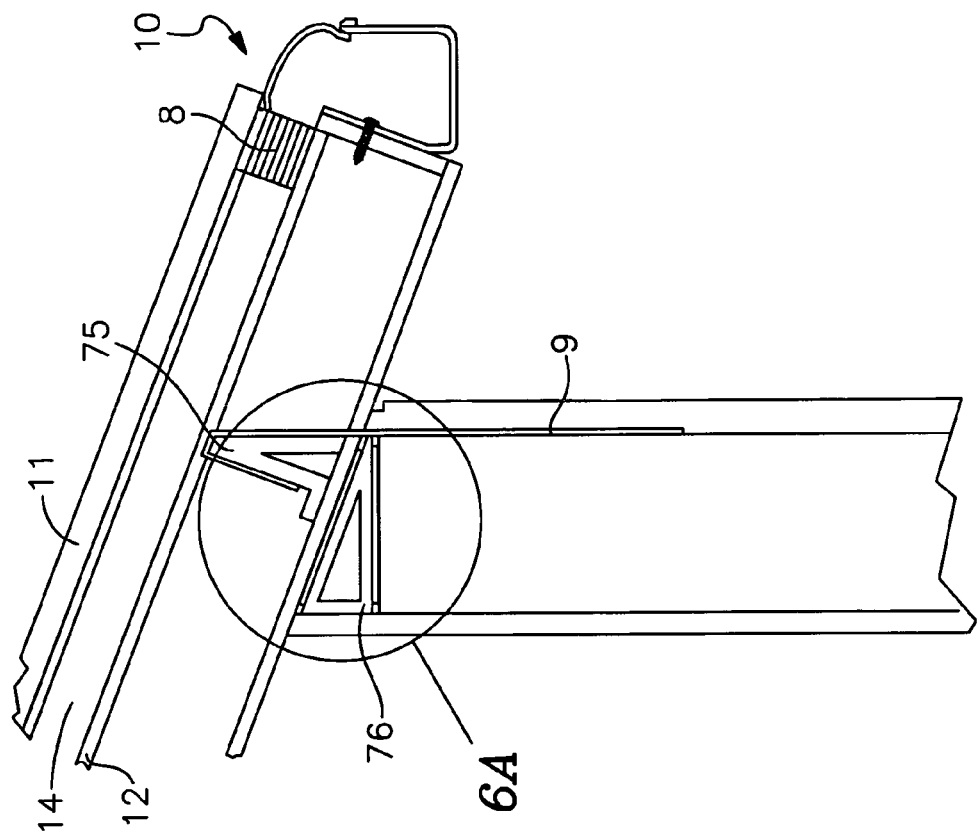

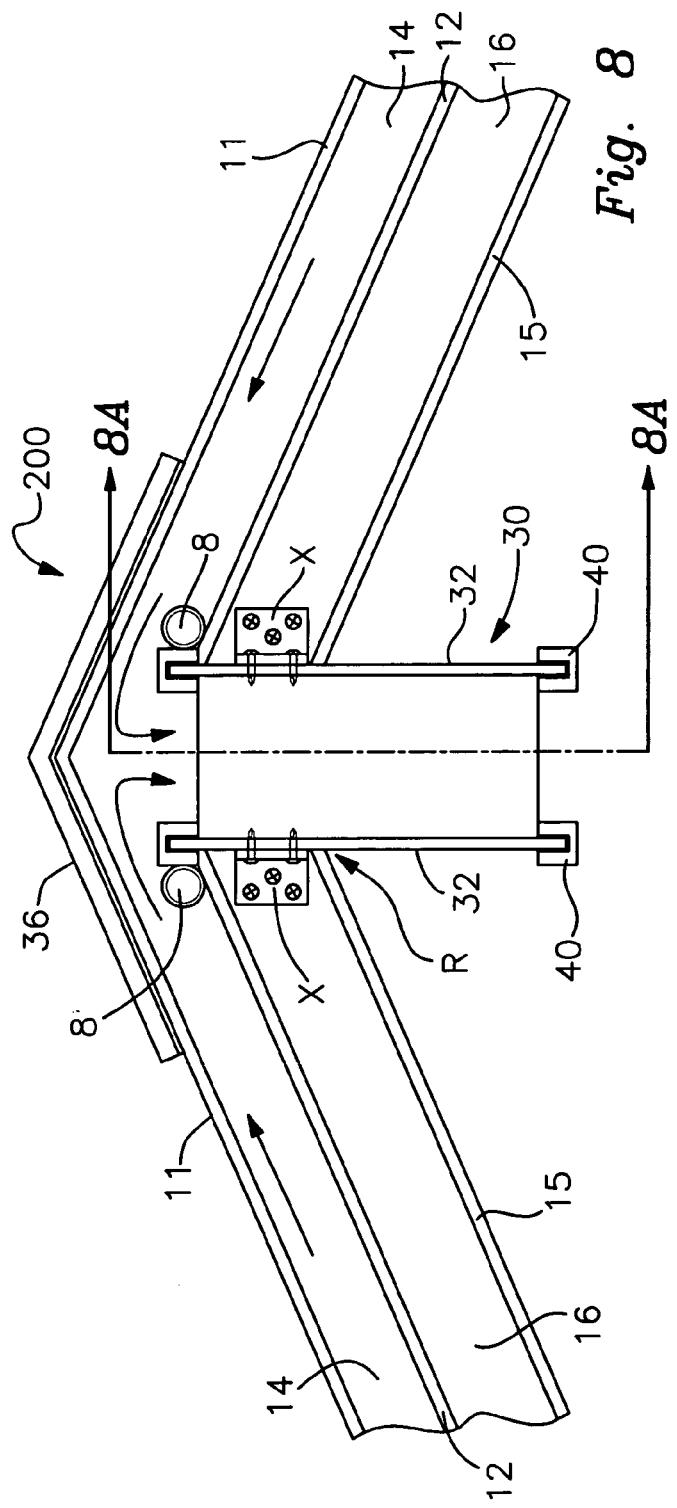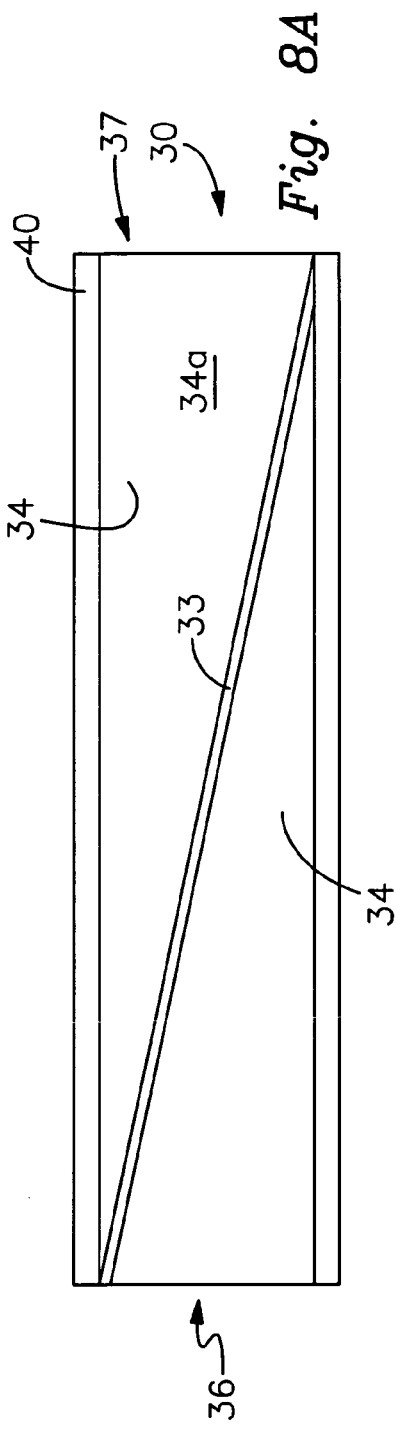

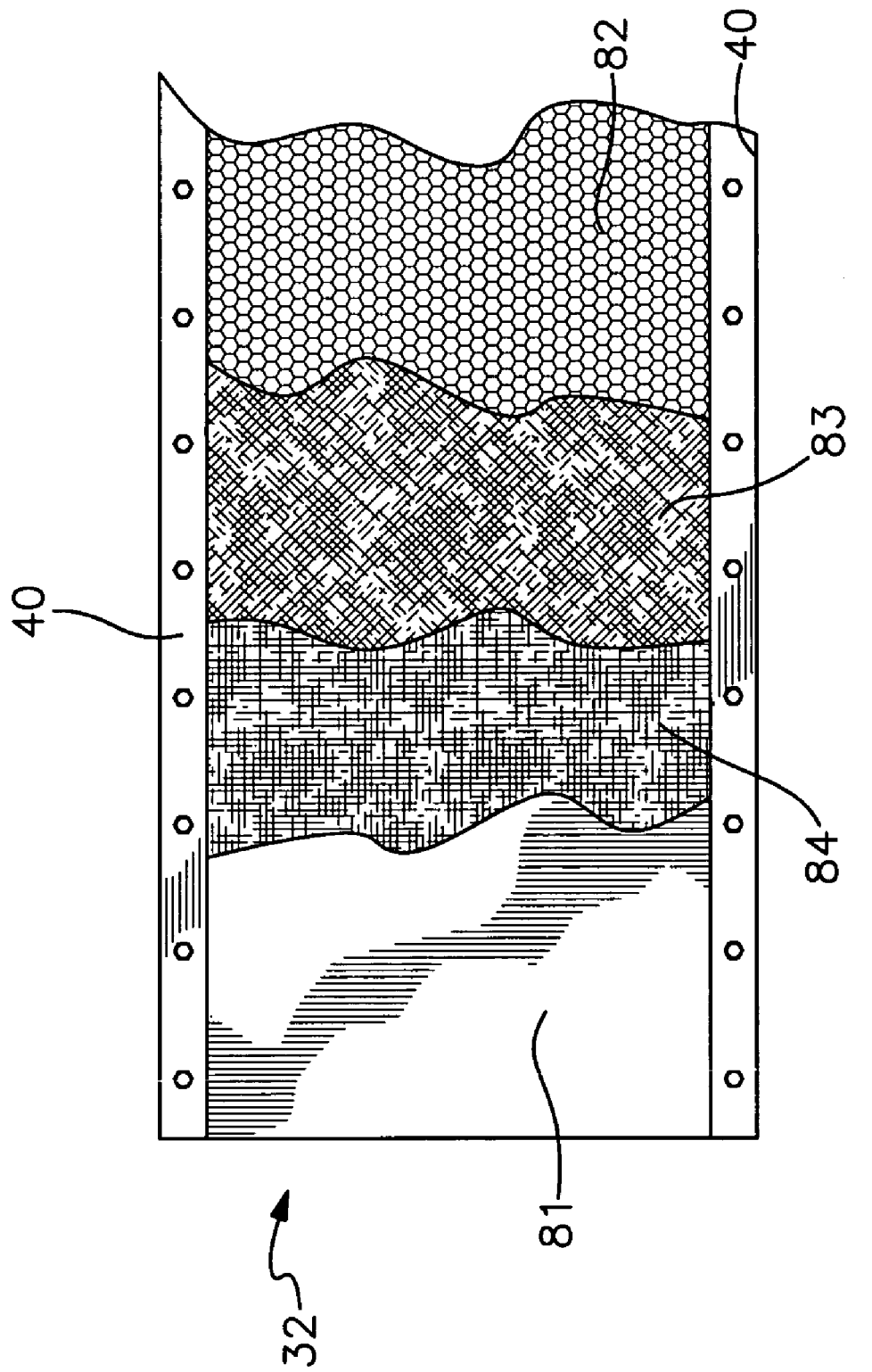

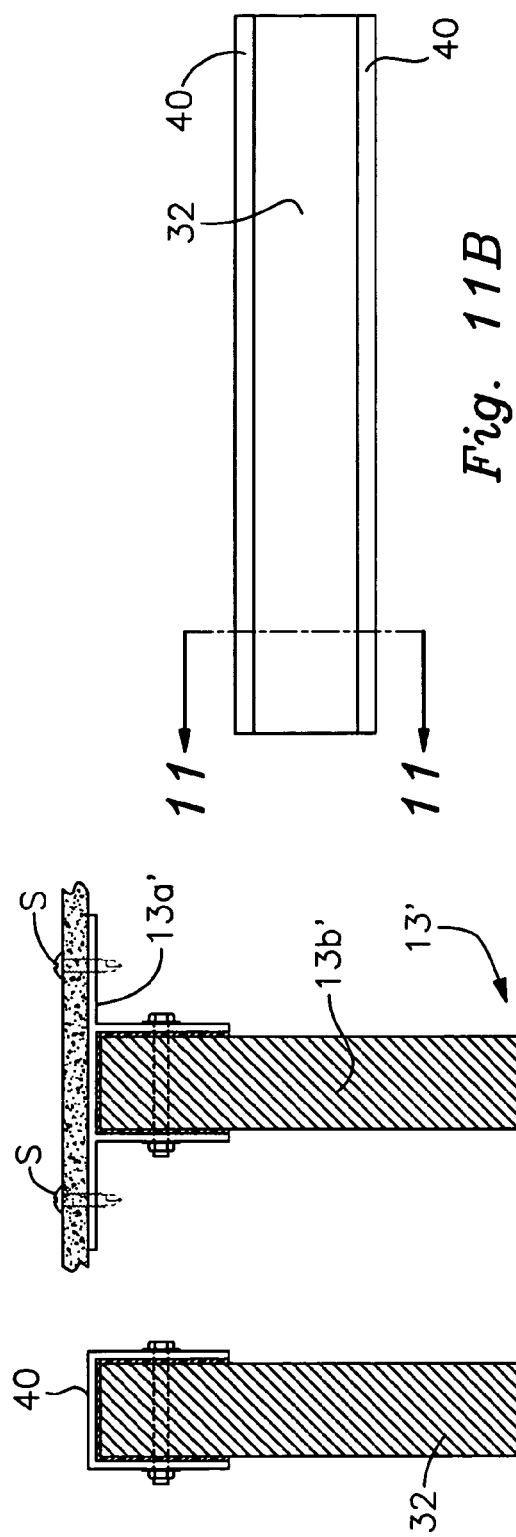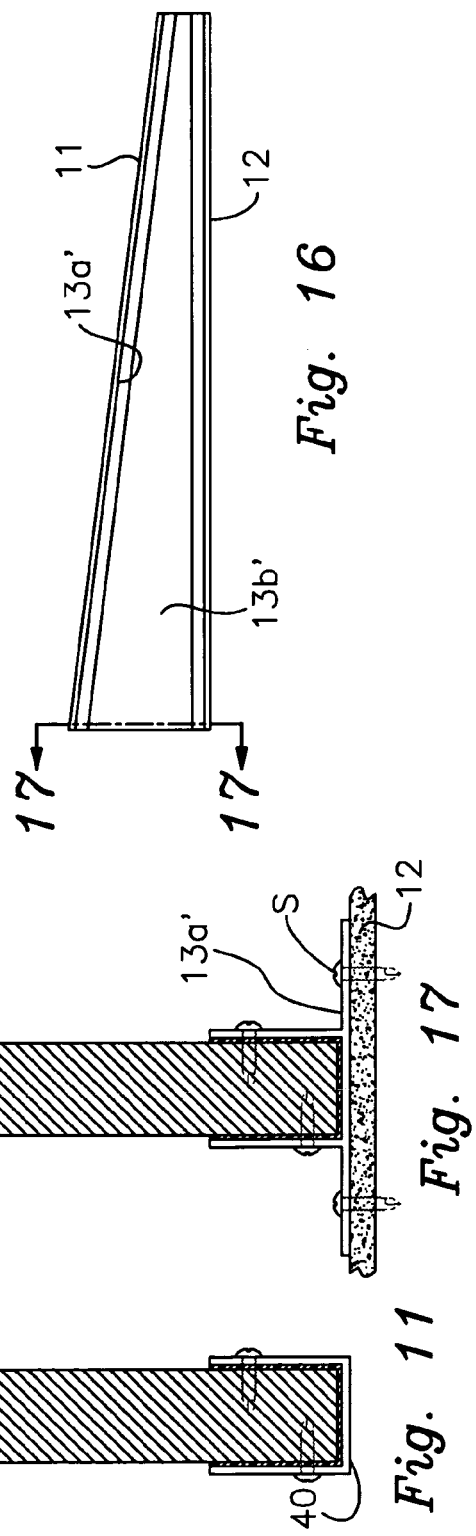

ROOF PANEL SYSTEMS FOR BUILDING CONSTRUCTION

This application claims the benefit of the filing of U.S. provisional application Ser. No. 60/877,963, filed Dec. 29, 2006, which is incorporated by reference herein in its entirety.

SUMMARY OF THE INVENTION

The present invention is directed to novel roof panels, ridge beams assemblies, and roof panel assemblies for use in building construction. In certain embodiments of the inventive panels, as described and illustrated herein, the panel comprises an exterior sheet and an intermediate sheet subjacent to the exterior sheet, the sheets secured to one another by a first set of spaced apart vertical support members. Each of the vertical support members extend, in parallel with one another, from a first edge to a second edge of the panel such that the sheets, in combination with the first set of vertical support members, form a series of upper chambers therebetween. The panel also includes an interior sheet subjacent to the intermediate sheet, the intermediate sheet secured to the interior sheet by a second set of spaced apart vertical support members. Each of the second set of vertical support members extends, in parallel with one another, from the first panel edge to the second panel edge, such that the sheets, in combination with the second set of vertical support members, form a series of lower chambers therebetween.

The exterior sheet of the inventive panel is preferably formed of a solar heat absorbing material. Alternatively, the exterior sheet may be coated with, secured to, or layered by, a solar heat absorbing material. The exterior sheet may also comprise two layers, with a top layer and a lower metallic radiant barrier layer. In certain embodiments, depending upon the type of ridge beam configuration employed for the roofing system, the exterior sheet may have a shorter length than the intermediate sheet to form a gap between the sheets near the first edge of the panel.

In certain embodiments of the inventive panels, at least a portion of the exterior sheet of the panel may include a solar panel for generating electricity within the upper chambers. Moreover, at least a portion of the exterior sheet may include at least one translucent or transparent section for admitting light through the panel, or include a solar collector for distributing sunlight throughout the building. The panels may include one, two, or all three of the foregoing features (i.e. translucent/transparent sections, solar panels, and solar collectors).

The upper chamber of the panel, in certain panel embodiments, may be an air chamber that is tapered from the first edge of the panel to the second edge of the panel. Alternatively, the exterior and intermediate sheets forming the upper chamber, in combination with the vertical support members, form a substantially rectangular chamber. At least a portion of the panel chambers may also have a material coated thereon, layered therein, filled therewith, or secured thereto. Such material may be selected from the group of insulation materials, fire proofing materials, sound attenuation materials, heat absorbing materials, and armor.

Other aspects of the inventive roof panels include one or more of the upper or lower chambers having water bladders for heating water within the chambers, the bladders further including a water inlet secured to a water tube and a water outlet secured to a second tube.

Other aspects of the inventive roof panels may include one or more pipes which may be used for flushing water therethrough for purposes of fire suppression.

The vertical support members of the panels may be formed of composite materials, metals, or metal alloys. The vertical support members may also have different configurations, comprising I-beams, C-channel members, box beams, and Z-channel members. The vertical support members may also be molded in webs with the sheets of the panel during the fabrication of the sheets in cases where the sheets are formed of a composite or extruded material.

The roof panels may include at least one vent positioned near one of the edges of the panel between the exterior and intermediate sheets to prevent the entry of debris and pests therein when the panels are secured to a building. Certain embodiments of the panels may also include opposing side ends configured for interlocking engagement with adjacent panels to form a contiguous building roof, wherein one of the opposing side ends is a female socket joint and a second opposing end is a male socket joint configured to engage within the female socket joint of the adjacent panel. When the two socket joints are interlocked (adhesively or mechanically), the resulting interlocked joint is stronger than either one of the female or male joints alone (as previously disclosed in the inventor's earlier U.S. patent application Ser. No. 11/249,650, which is incorporated herein in its entirety.

Novel ridge beam designs are also disclosed, comprising a pitched top portion and a pitched lower portion, the top and lower portions secured to one another by a central web extending vertically from the peak of the top portion and perpendicularly to the lower portion to create opposing sockets for engaging edges of opposing roof panels therebetween from the ridge beam to an eave of the roof. The lower portion of the ridge beam includes a horizontal flanged cap integral with and positioned below the lower portion. This cap, in combination with the lower portion of the ridge beam, forms at least one channel suitable for running electrical and utility wiring and cables therethrough. Other novel ridge beam assemblies are described herein with respect to their attachment to panels, including the inventive panels of the present invention.

The present invention, in certain embodiments, is also directed to novel roof panel assemblies for attachment to a building, either as the actual roof of the building, or as a separate retrofit component for attachment to the top of an existing building roof, as described further below. In certain aspects, the novel roof panel assembly comprises a horizontal ridge beam for attachment to two or more load bearing columns or load bearing walls of a building or to an existing roof of the building, the ridge beam having a floor and two opposing side walls extending upward from the floor to form an inner channel with opposing terminal ends and an open top end. The roof panel assembly further includes one or more of the inventive roof panels described above that are secured to one of the side walls of the beam, and one or more inventive roof panels described above secured to the adjacent side wall of the beam, such that the roof panels are secured to the ridge beam at the first panel edges. Specifically, the inventive panels each comprise an exterior sheet formed of, coated with, or layered by, a solar heat absorbing material, and an intermediate sheet subjacent to the exterior sheet, the sheets secured to one another by a first set of spaced apart vertical support members. Each of the vertical support members extend, in parallel with one another, from a first edge to a second edge of the panel such that the sheets, in combination with the first set of vertical support members, form a series of upper chambers therebetween. The panel also includes an interior sheet subjacent to the intermediate sheet, the intermediate sheet secured to the interior sheet by a second set of spaced apart vertical support members. Each of the second set of vertical support members extends, in parallel with one another, from the first panel edge to the second panel edge, such that the sheets, in combination with the second set of vertical support members, form a series of lower chambers therebetween.

A ridge beam top cap is secured to the exterior sheets of the aforementioned inventive panels, the top cap extending the length of the ridge beam, and wherein the upper chamber and lower chamber run perpendicular to the ridge beam such that the upper chamber is in communication with the ridge beam channel to accommodate air flow from the upper chamber of the panels into the ridge beam channel. A hollow vertical member, such as a chimney, is also provided which is in communication with the ridge beam (either integral with one or both of the terminal ends of the ridge beam and/or is located within the length of the ridge beam between the terminal ends). The vertical member includes an inner chamber in communication with the channel of the ridge beam to direct heated air flow therein. A set of end caps are provided to seal the lower chambers at the second edge of the panels, and another set of end caps are provided along the front and rear ends of the roof panel assembly.

The ridge beam of the roof panel assembly described above further includes a rectangular plate secured within the inner channel, the rectangular plate having a rear end secured near the top edge of the ridge beam at the rear terminal end, and a front end secured near the ridge beam floor at the front terminal end of the beam to create upper and lower air plenums within the ridge beam through which air may flow from the roof panels. Alternatively, the ridge beam floor of the inner channel may be a sloped rectangular plate extending near the top edge of the ridge beam at the rear terminal end toward the front terminal end of the beam to create a single triangular-shaped air plenum within the ridge beam through which air may flow from the roof panels. The floor of the ridge beam also includes one or more openings penetrating therethrough for communication with an underlying heat register. In addition, the angled ridge beam plate has at least one opening penetrating therethrough to allow air to travel therethrough.

The hollow vertical member of the foregoing roof panel assembly may also be in communication with a fan, which in turn is in further communication with an electricity-generating alternator or generator contained within the hollow member, whereby as air flows through the vertical member, the fan turns to activate the electricity generating alternator or generator. The hollow vertical members may also be in communication with the interior of the building, such that the heated air is diverted into the building to heat the building via the vertical member. The roof panel assembly may also include an ozone generator air purification system within the ridge beam channel, whereby air flowing through the ridge beam channel is treated prior to entering the building through the hollow vertical members of the ridge beam.

The inventive panels employed with the foregoing roof panel assembly may also include air vents secured near each of the second panel edges to allow exterior air to flow therethrough into the roof panel and to screen out debris and pests. Also, as described above already, the upper chambers of the panels may be tapered from the first edge of the panel to the second edge of the panel. Moreover, in certain aspects, at least a portion of the panel chambers may have a material coated thereon, layered therein, filled therewith, or secured thereto, the material being selected from the group of insulation materials, fire proofing materials, sound attenuation materials, heat absorbing materials, and armor.

The inventive panels employed in the foregoing inventive roof panel assembly embodiment may also have exterior sheets wherein a portion of the exterior sheet includes a solar panel for generating electricity within the upper chambers, and/or at least one translucent or transparent section for admitting light through the panel, and/or a solar collector for distributing light throughout the building. One or more the upper or lower chambers may also comprise water bladders for heating water within the chambers, the bladders further including a water inlet secured to a water tube and a water outlet secured to a second tube, as described previously for the inventive panels.

Other aspects of the inventive roof panel assemblies of the present invention comprise a ridge beam having a pitched top portion and a pitched lower portion, the top and lower portions secured to one another by a central web extending vertically from the peak of the top portion and perpendicularly to the lower portion to create opposing sockets. The sockets are configured for engaging edges of opposing roof inventive roof panels therebetween from the ridge beam to an eave of the roof. As described above, the inventive roof panels each comprise an exterior sheet and an intermediate sheet subjacent to the exterior sheet, the sheets secured to one another by a first set of spaced apart vertical support members. Each of the vertical support members extend, in parallel with one another, from a first edge to a second edge of the panel such that the sheets, in combination with the first set of vertical support members, form a series of upper chambers therebetween. The panel also includes an interior sheet subjacent to the intermediate sheet, the intermediate sheet secured to the interior sheet by a second set of spaced apart vertical support members. Each of the second set of vertical support members extends, in parallel with one another, from the first panel edge to the second panel edge, such that the sheets, in combination with the second set of vertical support members, form a series of lower chambers therebetween. A first such inventive panel has a first edge engaged within one of the sockets of the ridge beam. This first panel has an exterior sheet shorter in length than the intermediate sheet to form a gap between the sheets near the first edge of the panel. A second inventive panel as just described also has the first edge engaged within the opposing socket of the ridge beam, the second panel also having an exterior sheet shorter in length than the intermediate sheet to form a gap between the sheets near the first edge of the panel. This embodiment of the inventive roof panel assemblies is designed such that air from outside of the roof flows through the upper chamber of the panel from the second panel edge and exits through the panel gap beneath the top portion of the ridge beam.

The foregoing roof panel assembly described in the preceding paragraph may further include (a) a vent positioned between the top portion of the ridge beam and the exterior sheet of at least one of the panels, and (b) a vent positioned between the exterior sheet and intermediate sheet of each of the panels near the second panel edges, wherein the vents are designed to prevent pests and debris from entering the panel while allowing air to enter and exit the panel through the upper chambers.

The panels of the foregoing roof assembly embodiment may also be secured within one or both of the sockets of said ridge beam such that the exterior sheet is secured to the top portion, resulting in no gap existing between the exterior sheet and the top portion, whereby when air flows into the upper chambers of the panels, the air is diverted through a ridge beam chamber contained within the gap. The roof panel assembly may further include one or more pipes within the panel or ridge beam. At least one pipe is preferably a water pipe for flushing water therethrough for purposes of fire suppression.

As described earlier for the other embodiments of the roof panel assembly of the present invention, a portion of the panel chambers of the inventive panels employed may have a material coated thereon, layered therein, filled therewith, or secured thereto, the material being selected from the group of insulation materials, fire proofing materials, sound attenuation materials, heat absorbing materials, and armor. Moreover, the inventive panels employed in this embodiment may also have exterior sheets wherein a portion of the exterior sheet includes a solar panel for generating electricity within the upper chambers, and/or at least one translucent or transparent section for admitting light through the panel, and/or a solar collector for distributing light throughout the building. One or more the upper or lower chambers may also comprise water bladders for heating water within the chambers, the bladders further including a water inlet secured to a water tube and a water outlet secured to a second tube, as described previously for the inventive panels. The roof panel assembly may further include one or more pipes within the panel or ridge beam. At least one pipe is preferably a water pipe for flushing water therethrough for purposes of fire suppression.

Other embodiments of the inventive roof panel assembly include a T-shaped ridge beam having a horizontal top portion and a horizontal lower portion, each secured to a central web portion extending vertically downward, the central web portion bisecting the top and lower portions into two flanges. An upper wedge is secured beneath the top portion flange on one side of the ridge beam and a second upper wedge secured beneath the top portion flange on the opposing side of the ridge beam. Two panels are secured to one side of the ridge beam beneath one of the upper wedges. One lower wedge is secured between one of the panels and the lower horizontal portion flange, and a second lower wedge is secured beneath the second panel and the lower horizontal portion flange. Each of the upper and lower wedges has a slope that matches the desired pitch of the panels of the roof assembly and the angles of the underlying wall of said building. In certain aspects of this embodiment, the panels have a different pitch from one another when secured to the ridge beam. At least one of the ridge beam sockets may include an air vent extending downward from the top portion, such that when the panel is engaged therein, the vent is positioned between the top portion of the ridge beam and the panel. The foregoing roof assembly embodiment may incorporate the inventive panels described herein. The roof panel assembly may further include one or more pipes within the panel or ridge beam. At least one pipe is preferably a water pipe for flushing water therethrough for purposes of fire suppression.

The present invention is also directed to methods of installing the inventive roof assemblies onto a building, one such method comprising (a) securing one of the inventive panels within one socket of the ridge beam to provide a partially pre-assembled roof component, the ridge beam having a pitched top portion and a pitched lower portion, with the top and lower portions secured to one another by a central web extending vertically from the peak of the top portion and perpendicularly to the lower portion to create opposing sockets for engaging edges of opposing roof panels therebetween from the ridge beam to an eave of the roof; (b) transporting the partially pre-assembled roof component to the building and placing the component onto temporary support members; (c) securing (e.g. adhesively or mechanically) a second inventive panel into the opposing socket of the ridge beam to provide a completely assembled roof component; and (d) securing the completely assembled roof component onto supporting building walls or columns. The panels may include one or more angle bracket secured to flange portions of the vertical support member of the panel, wherein the step of securing the completely assembled roof component onto the walls includes fastening the panel to the walls via straps secured to the angle bracket and to an underlying supporting column of the wall. The method may also include, prior to the step of securing the completely assembled roof component to said underlying wall, securing a duplicate wedge angle to the top end of the column or two of the supporting walls to accommodate the same downward angle of the panel of the fully assembled roof component.

The present invention also includes a method of securing a roof assembly comprising at least one of the inventive panels described herein to an underlying load bearing column beneath an eave of the roof assembly, wherein the roof panel includes a an angle bracket secured between the flanges of an I-beam of the panel on each side of the I-beam, such that the I-beam has adjacent angle brackets. This method further includes (a) placing the roof assembly upon the load bearing column or load bearing wall; (b) securing one end of a strap to the back of the bracket; (c) wrapping the strap over the bracket, and downward along the underlying column; and (d) securing a second end of the strap to the underlying column. The strap may formed of a metal, metal alloy, or a composite fiber material.

Certain aspects of the present invention also include a ridge beam for securing roofs to buildings, wherein the ridge beam comprises two opposing side walls, each of the side walls having a top edge and a lower edge, with each of the edges having secured thereto a C-shaped cap extending from one end of the side wall to an opposing end of the side wall. A lower floor is secured upon at least a portion of the lower edge cap, such that the beam has an open top end and an inner channel through which air may flow. The side walls are preferably a laminate comprising an outer cover and a core of material layered with a second material selected from the group of fibers, mats, and resins. The core of the material is preferably wood and the resins preferably polyester.

Other aspects of the present invention also include an angled I-beam, preferably used for attaching the exterior sheet to the intermediate sheet of the inventive panels. The I-beam has a top edge and a lower edge, with each edge having secured thereto a double T cap extending from one eave edge of the panel to the ridge beam edge of the panel when used in this fashion. The I-beam includes a web portion between the caps. The web is preferably a laminate comprising an outer cover and a core of material layered with a second material selected from the group of fibers, mats, and resins as aforementioned.

BRIEF DESCRIPTION OF THE DRAWINGS

FIG. 6 is a side sectional view of the roof panel assembly secured to an underlying column of a building.

FIG. 6A is an enlarged view of a portion of the view shown in FIG. 6.

FIG. 8 is a front cross sectional view of the first embodiment of the inventive roof panel taken along lines 8-8 of FIG. 1A.

FIG. 8A is a sectional view of a portion of the ridge beam taken along lines 8A-8A of FIG. 8.

FIG. 11 is a front edge view of a laminate side wall used for the fabrication of the ridge beam of FIGS. 8-10.

FIG. 11A is a side view of the side wall shown in FIG. 12, cut away to show preferred laminate layers of the side wall.

FIG. 11B is an enlarged side view of the inventive ridge beam shown in FIGS. 8, 8A, 9, and 10.

FIG. 16 is an enlarged side view of tapered upper chamber of the inventive panels shown in FIGS. 2, 2A, 3 and 3A.

FIG. 17 is an end view of the I-beam of FIG. 16 for use in fabricating the tapered upper chambers of the inventive panels.

DETAILED DESCRIPTION THE EMBODIMENTS

The present invention is directed to novel roof panel assemblies incorporating, in certain aspects, novel panel designs and ridge beam designs. One advantage of the inventive roof assemblies is that they are designed to accommodate and transfer therethrough air, whereby the air is solar heated within the novel panels and may subsequently be directed to exit the building entirely, or the heated air may be directed, via the roof panel assemblies, into the building interior to heat the building interior. Alternatively, the heated air may be purified prior to being circulated within the building, and/or the heated air may be used to generate electricity, as described in greater detail below.

Figure 5:
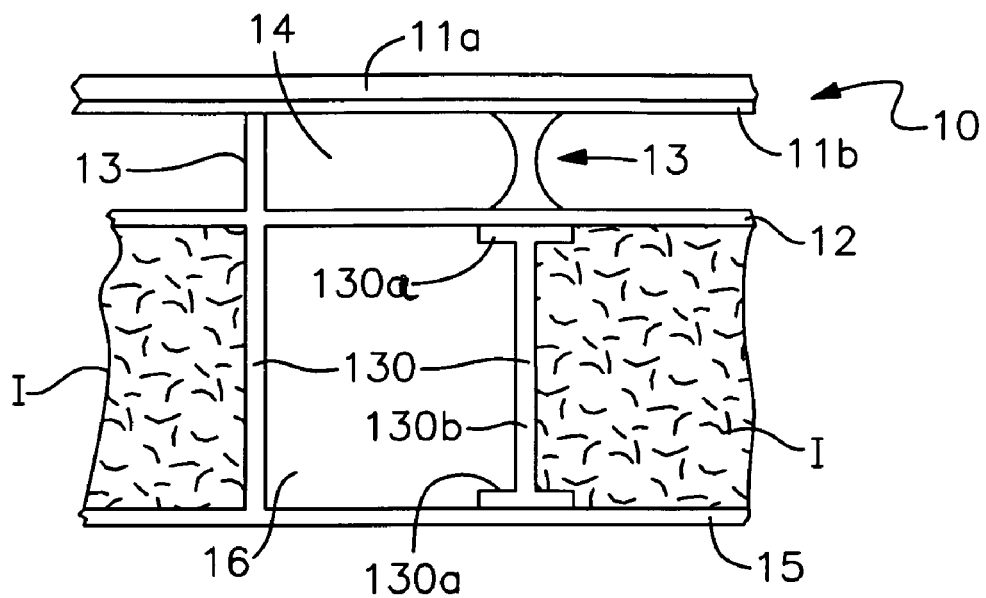
FIG. 5 is a front sectional edge view of a portion of the inventive roof panel.
Figure 15:
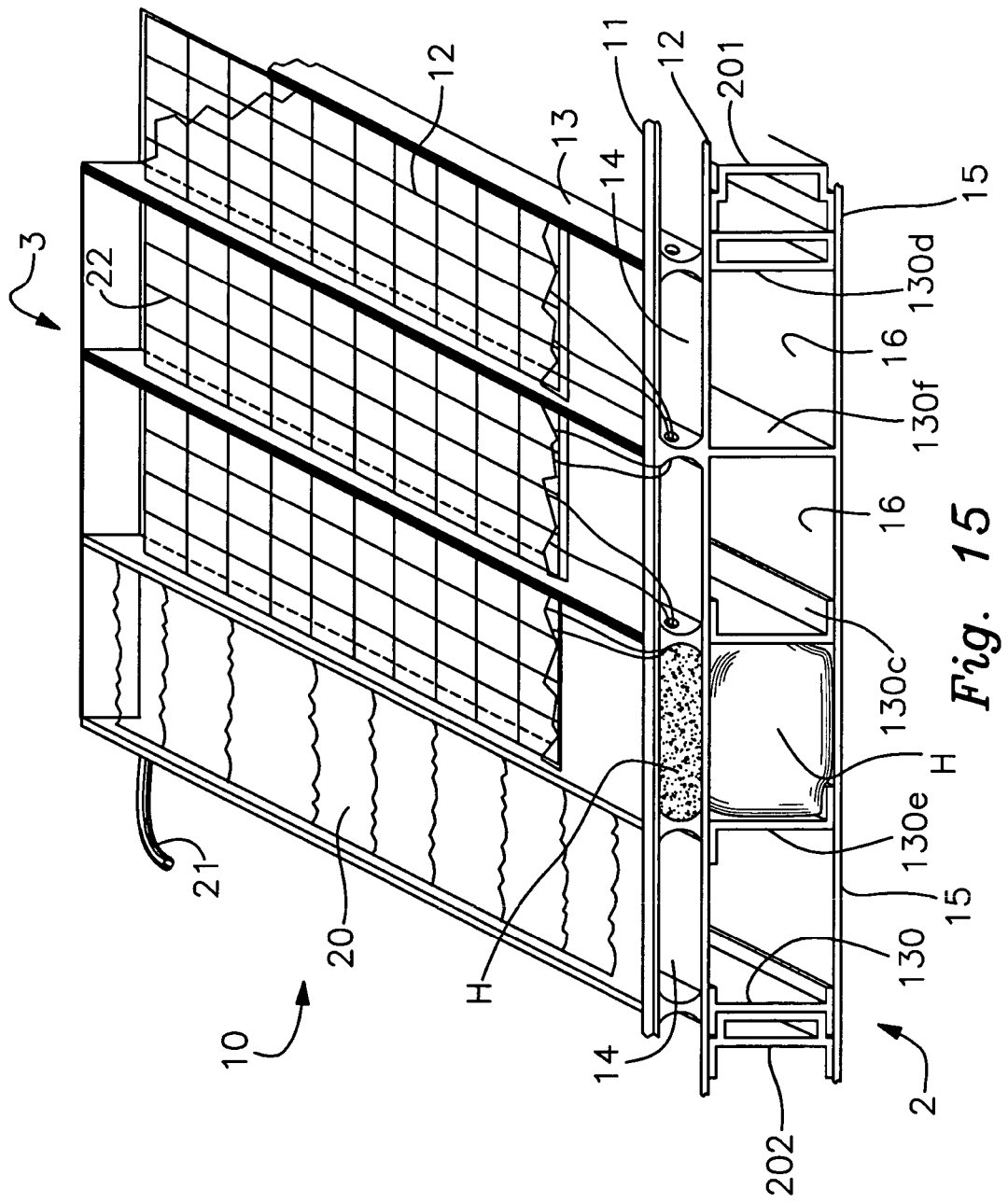
FIG. 15 is a front perspective view of an inventive panel, illustrating the incorporation of solar panels, windows, insulation, heat absorbing materials, and water bladders within different chambers.

Referring now to the figures, certain aspects of the present invention are directed to a roof panel 10, as shown in several of the figures. As best shown in FIGS. 5 and 15, the inventive panel 10 includes an exterior sheet 11 and an intermediate sheet 12 subjacent the exterior sheet 11. Both sheets 11,12 are secured to one another by a set of spaced apart vertical support members 13, such as I-beams, as shown in FIGS. 5 and 15. As better shown in FIG. 15, the vertical support member 13 extends from one edge 2 of the panel to an opposing edge 3 of the panel. The vertical members run parallel to one another to create a series of upper chambers 14 therebetween. The inventive panels further include an interior sheet 15 subjacent the intermediate sheet 12, both sheets also secured to one another by a second set of spaced apart vertical support members 130, as shown in FIGS. 5 and 15, which are also preferably I-beams similar to, or the same as, the vertical support members 13 described above for creating the upper chambers 14 of the panel 10. The lower vertical support members 130 extend from one edge 2 of the panel to the opposing edge 3 of the panel, in parallel, to create a series of lower chambers 16 therebetween. The intermediate sheet 12 is secured to the upper flanges 130a of the vertical support members 130, and the interior sheet 15 is secured to the lower flanges 130a of the lower vertical support members 130.

Figure 18:
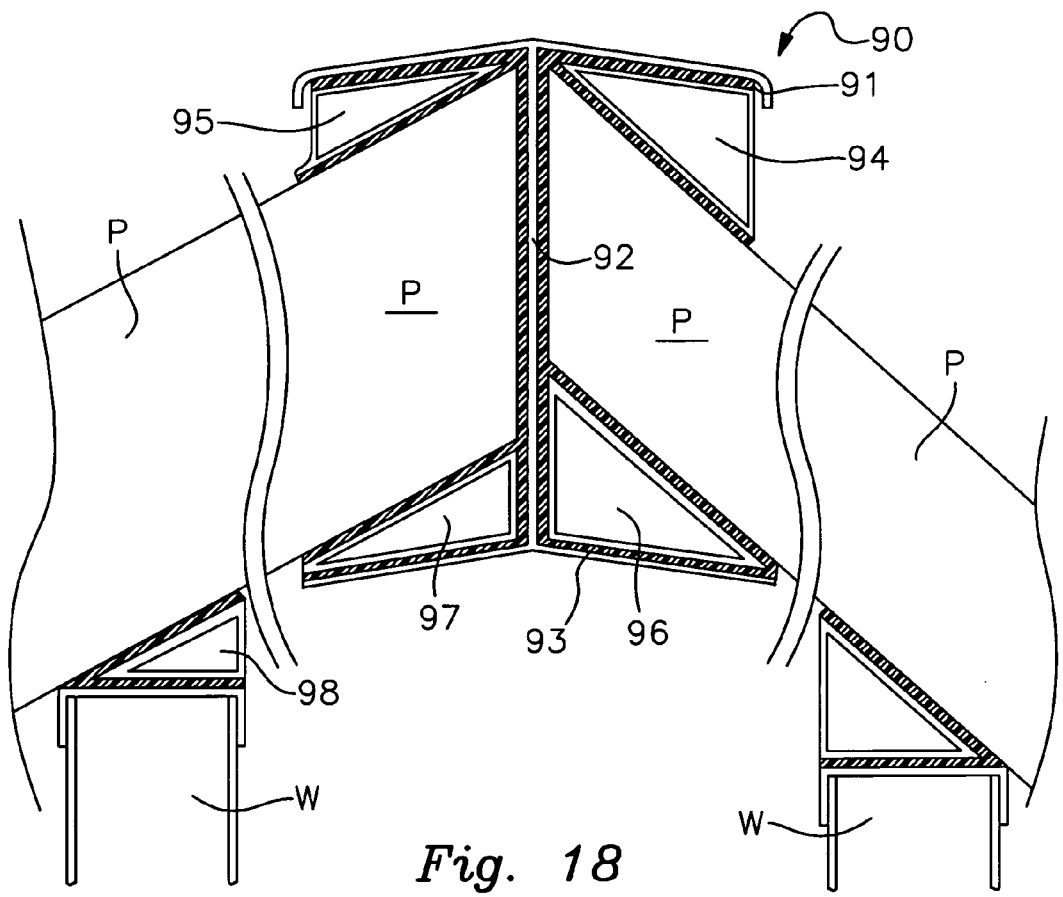
FIG. 18 is a side view of a third embodiment of a ridge beam used in the inventive roof panel assembly.

While the relative sizes of the vertical support members 13,130 are shown in FIG. 18, for example, it will be appreciated by those of ordinary skill in the art that the sizes of the vertical support members may be varied as desired to create the desired inner chamber size. Moreover, it will be recognized by those of ordinary skill in the art that other vertical support member designs may be employed, as shown in FIG. 15, such as C-channel members 130c, box channel members 130d, Z-channel members 130e, and any other suitable configurations of such members for example, all of which may be separate components that are mechanically and/or adhesively secured to the respective panel sheets. Alternatively, the vertical members may be molded in webs (referenced generally at 130f in FIG. 15) forming an integral component with the interior and/or intermediate sheets (for the lower chamber) during the fabrication of those sheets. Similarly, a molded in web construction could be employed for the upper chamber 13g in FIG. 5. While FIG. 15 shows the alternative vertical support configurations for the lower vertical support members 130, it should be understood that the same configurations may be employed for the upper vertical support members 13. As discussed further below, the vertical members of the upper chamber may be tapered I-beams $13^1$ which provide for a tapered upper chamber configuration. Finally, the vertical support members 13,130 may be formed of any conventional building material known by those of ordinary skill in the art; however, preferably the members are formed of composite materials as described in greater detail in the inventor's co-pending U.S. patent application Ser. No. 11/116,769, which is incorporated by reference herein in its entirety.

The exterior sheet 11 is preferably formed of, or coated with, a solar heat absorbing material. Exemplary materials include, but are not limited to, commonly used roofing materials such as steel, aluminum, shingles, membranes, paints, and the like. When the exterior sheet is not formed of steel, aluminum or a similar metal sheet, a metallic radiant barrier layer is applied to the lower surface of the exterior sheet, as shown, such that the exterior sheet comprises a top layer 11a and the lower radiant barrier layer 11b. In FIG. 18, the preferred radiant barrier is aluminum, although other metallic materials known by those of ordinary skill in the art could be employed. Exemplary materials for fabricating the intermediate sheet 12 include, but are not limited to, composite laminates, wood sheeting, magnesium oxide boards, membrane covered pressboard sheets, and the like. The interior sheet 15 may serve as the interior building ceiling or may be a separate sheet that rests upon the building roof or trusses. The interior sheet may be formed of composite laminates, conventional ceiling materials, including, not limited to, commonly used ceiling materials, ceiling panels, gypsum board, cement board, magnesium oxide board, wood, composite laminates, pressboards, and the like or laminates thereof. The preferred material for the exterior sheet is steel, the preferred material for the intermediate sheet is fiber reinforced composite laminate, and the preferred material for the interior sheet is fiber reinforced composite laminate in hurricane, tornado, seismic, and disaster prone zones. The preferred material for the exterior, intermediate, and interior sheets in non disaster prone zones are shingles a radiant barrier, plywood, and fiber reinforced composite laminate respectively One or more of the upper chambers 14 may function as an air plenum to accumulate and direct hot air flow through the roof panel assembly, as discussed in greater detail below, or the chambers may contain water bladders, insulation materials, fire proofing materials, and/or sound attenuation materials. Similarly, one or more of the lower chambers 16 may remain empty or contain water bladders, insulation materials, fire proofing materials, and/or sound attenuation materials, referenced generally as I, in FIG. 5. One or more of the chambers 14, 16 may also be coated with armor, insulation materials, fire proofing materials, or sound attenuation materials. In most roof panel assemblies incorporating the inventive panels, discussed in more detail below, vents 8 (shown in FIGS. 2, 3, and 6, for example) are secured near one edge of the panel between the exterior sheet 11 and intermediate sheet 12 to prevent the entry of pests and debris within the panels. When the panels are secured to the ridge beam assemblies as described further below, the edge of the panels incorporating the vents 8 comprise the eave edge E of the roof panel assembly.

One or more of the upper chambers 14 may function as an air plenum to accumulate and direct hot air flow through the roof panel assembly, as discussed in greater detail below, or the chambers may contain water bladders, insulation materials, fire proofing materials, heat absorbing materials, and/or sound attenuation materials. Similarly, one or more of the lower chambers 16 may remain empty or contain water bladders, insulation materials, fire proofing materials, attenuation materials, and/or heat absorbing materials, referenced generally as I, in FIG. 5. One or more of the chambers 14, 16 may also be coated or filled with armor, insulation materials, fire proofing materials, head absorbing materials and/or sound attenuation materials. In most roof panel assemblies incorporating the inventive panels, discussed in more detail below, vents 8 (shown in FIGS. 2, 3, and 6, for example) are secured near one edge of the panel between the exterior sheet 11 and intermediate sheet 12 to prevent the entry of pests and debris within the panels. When the panels are secured to the ridge beam assemblies as described further below, the edge of the panels incorporating the vents 8 comprise the eave edge E of the roof panel assembly.

Figure 14:
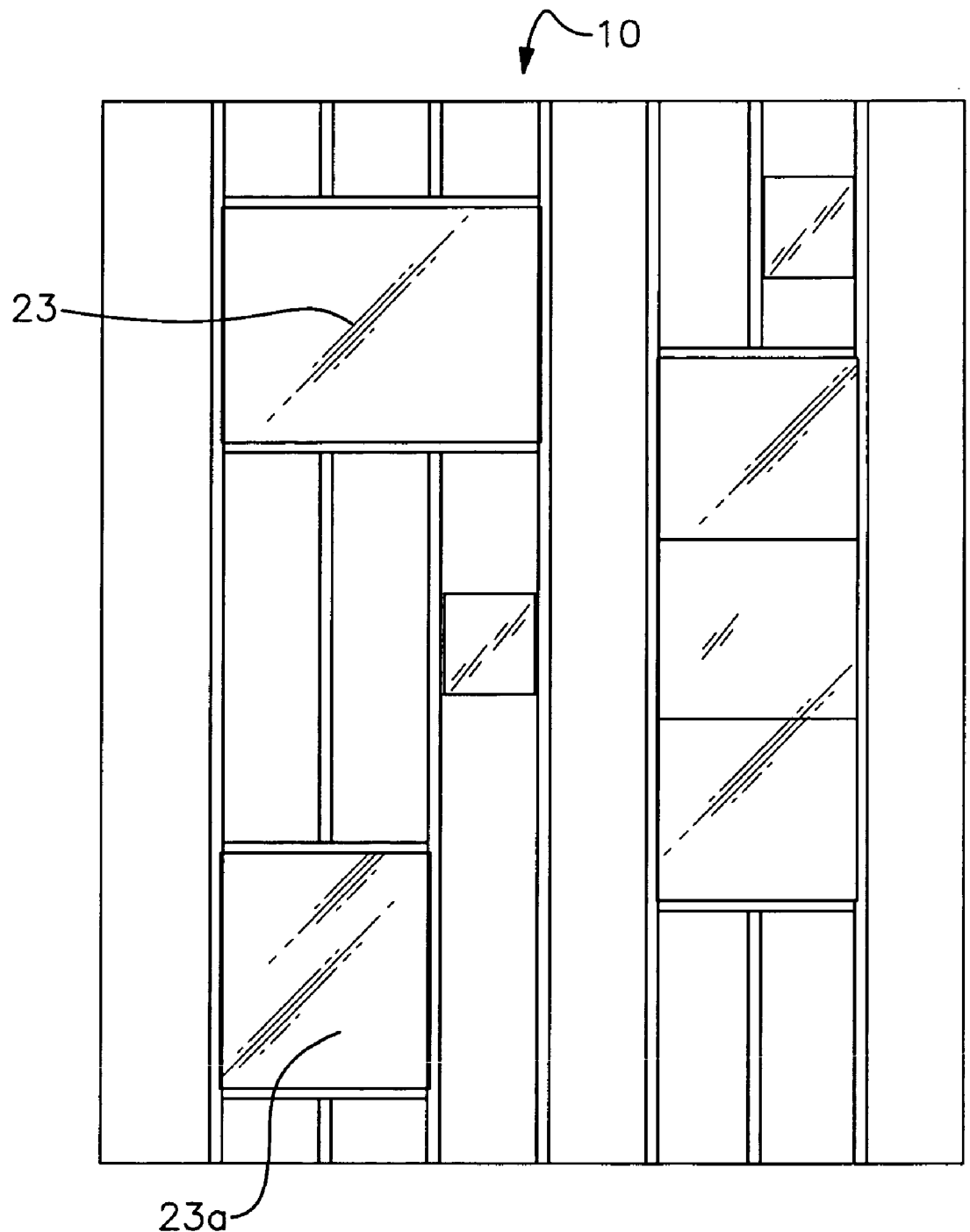
FIG. 14 is a top view of the inventive panel showing the incorporation of windows and solar collectors.

FIG. 15 illustrates an exemplary panel 10 incorporating on the far left side a water bladder 20 within one of the upper chambers 14 and lower chamber 16. As the exterior sheet (not shown over the chamber containing the water bladder in FIG. 15, for ease of illustration) absorbs solar energy therethrough, the heat is passed on into the upper chamber to heat the water within the water bladder 20. The heated water may be transported to a tank (not shown) either outside of the building or inside of the building via hoses 21 connected to the water bladder. Alternatively, a heat absorbing material H may be filled in chambers 14 or 16 to further store or improve the heating of the water bladders. FIG. 15 also illustrates the incorporation of solar panel sections 22 within the exterior sheet for generating electricity to power the underlying building or to store in and electricity storage system. FIG. 14 further illustrates the incorporation of translucent or transparent sections 23 into the exterior, intermediate, and interior sheets to admit light through the panel and solar collector sections 23a in the exterior sheet for distributing day-lighting to interior sections of the building through fiber-optic cables (not shown).

The inventive panels, with certain modifications as discussed further below, may be incorporated into various roof panel assemblies. One novel aspect of the inventive panels, regardless of the type of roof panel assembly design is employed, is that the use of solar heat absorbing material for the exterior sheet, as discussed above, coupled with an intermediate sheet formed of a weather impervious material, results in roof panels that absorb solar heat (as opposed to reflecting the solar heat per conventional roof systems). This heated air or absorbed heat may then utilized within the interior of the roof panel assembly itself, directed into the underlying building, diverted into the atmosphere, purified with treatments of ultraviolet light, ozone, filtration, or electrostatic collection before use, or used to generate electricity using an alternator or generator or other electricity generating device. The inventive panels may also contain pipes 8 for flushing water through the air chambers 14 so as to rain through the edge roof vents for the purposes of fire suppression from wild fires or neighboring fires, for example.

Figure 1A:
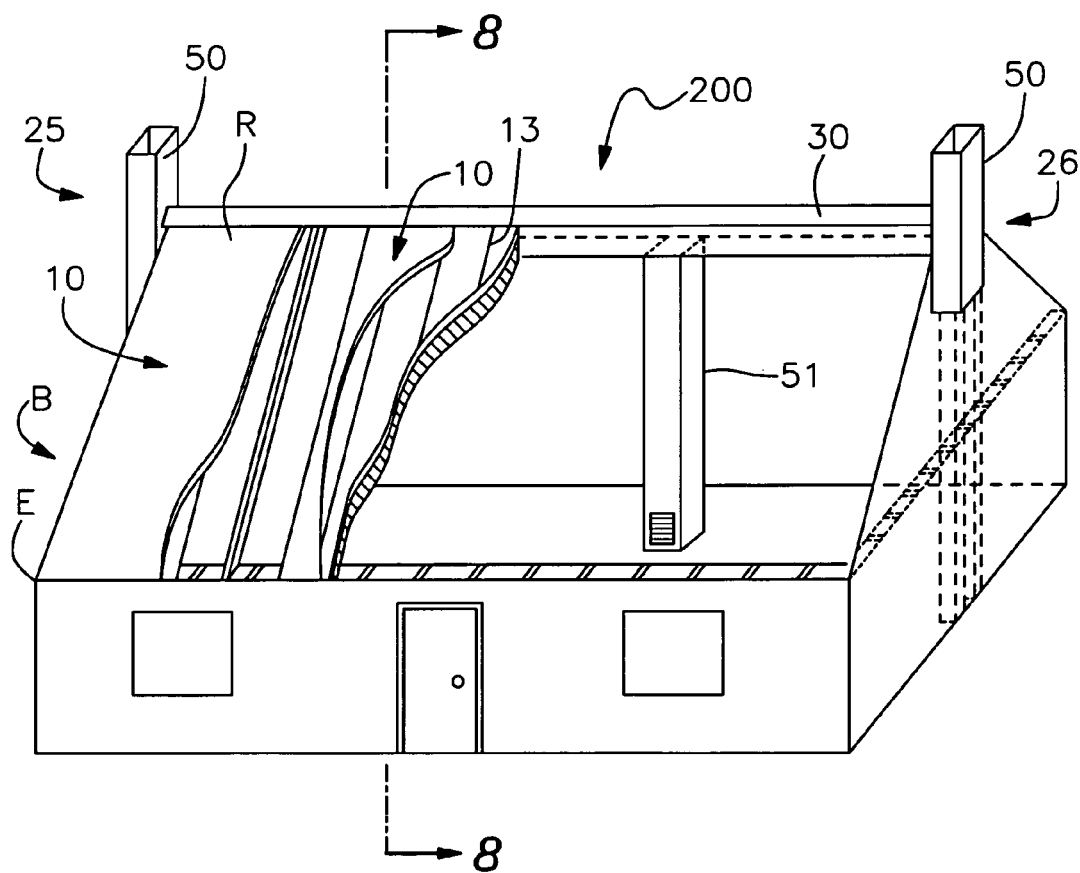
FIG. 1A is a perspective view of a building incorporating one embodiment of the inventive roof panel assembly schematically shown thereon.
Figure 1B:
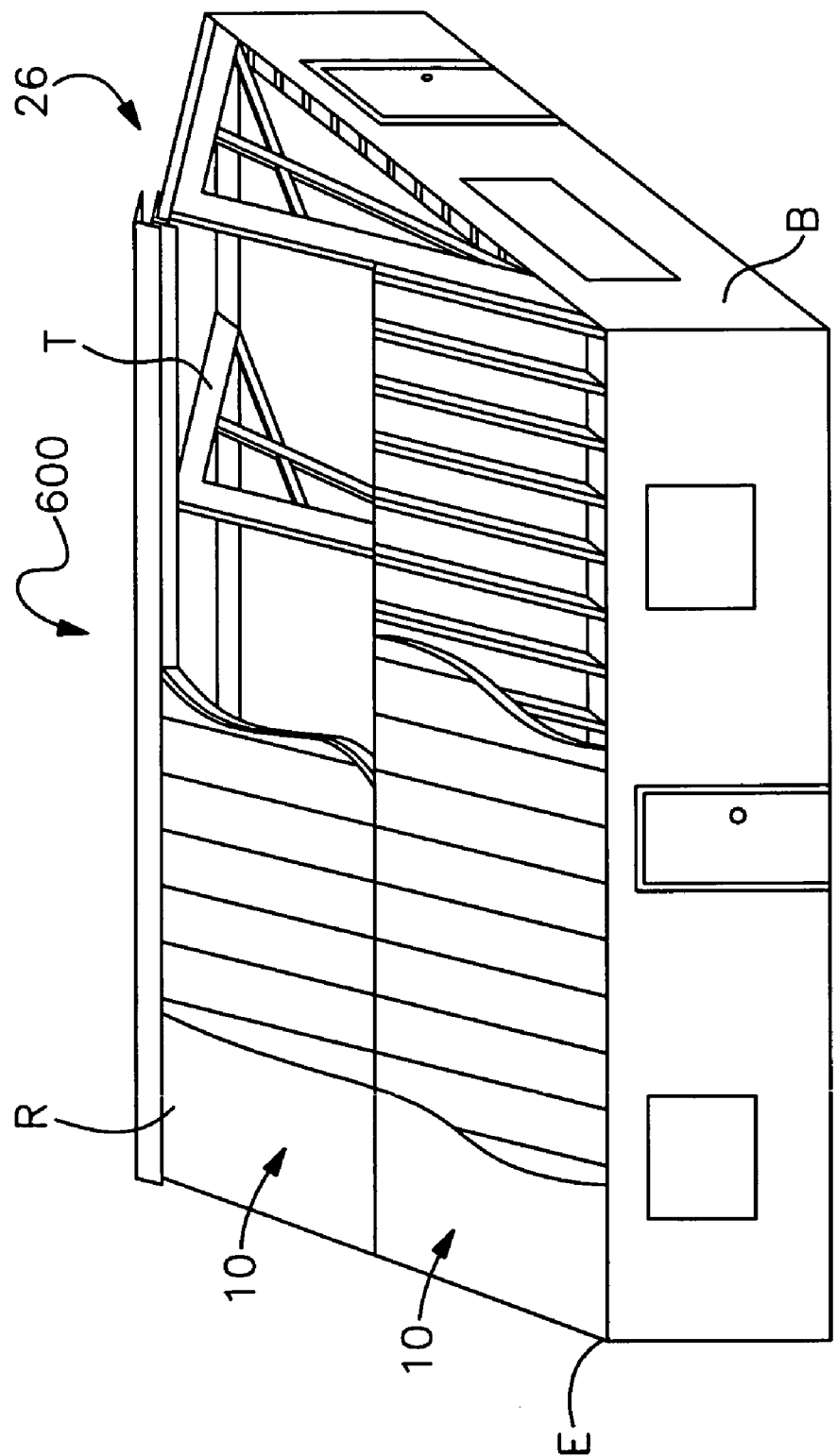
FIG. 1B is a perspective view of a building incorporating another embodiment of the inventive roof panel assembly schematically shown thereon
Figure 19:
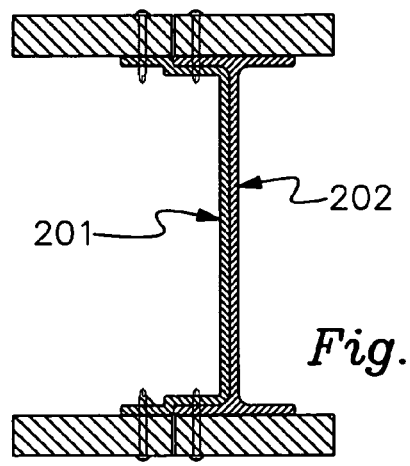
FIG. 19 is a side view of an exemplary male/female interlock connection for use in joining the ends of adjacent panels of the present invention.

The present invention is further directed to the use of the inventive panels, with or without certain modifications (as explained further below), in combination with novel ridge beam designs. In most of the embodiments, a roof panel is secured to each side of a central ridge beam; however, if desired, two or more panels may be secured to one another by male 201 and female 202 interlocking components, as best shown in FIGS. 15 and 19. In FIG. 1A, the panels span from the supporting ridge beam 30 to the supporting side wall W, the panels having been fabricated with the greater length in the vertical direction as shown. Wide roofs require that these panels be joined along a vertical axis. In FIG. 1B, the panels 10 are supported by widely separated trusses T or beams, the panels having been fabricated with the greater length in the horizontal direction to cover one or more spans. These latter panels as shown in FIG. 1B are attached using pads adhesively and/or mechanically fastened from the webs 13b, 130b of the vertical supports 13,130 of one panel to the corresponding webs 13b, 130b of the vertical supports 13, 130 of the adjacent panel to preserve the vertical orientation of the supports, as discussed in more detail below. Access to the webs is obtained through removable sections of the roof panels (not shown).

Figure 3:
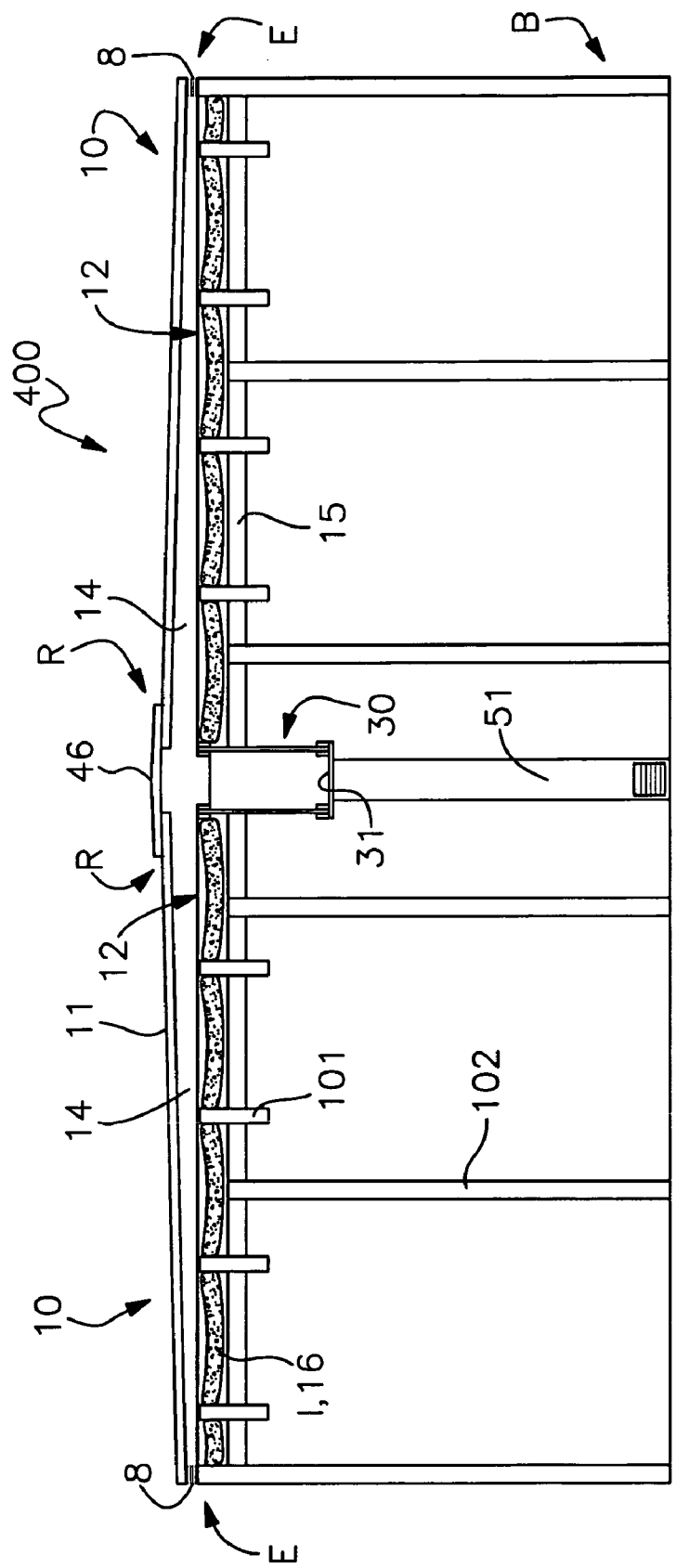
FIG. 3 is a front sectional view of a roof panel assembly similar to that shown in FIG. 2A, but designed to serve as the roof of the underlying building.
Figure 3A:
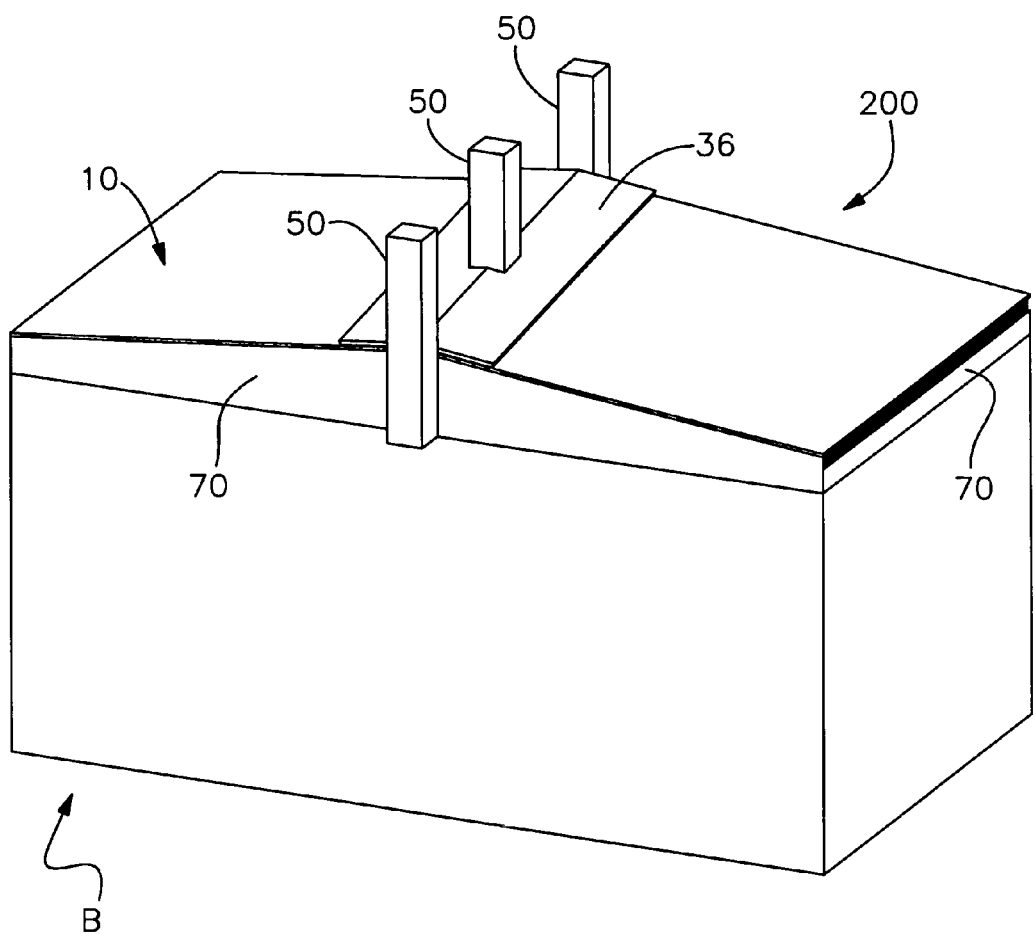
FIG. 3A is a perspective view of the roof assembly of FIG. 3 attached to a building.
Figure 9:
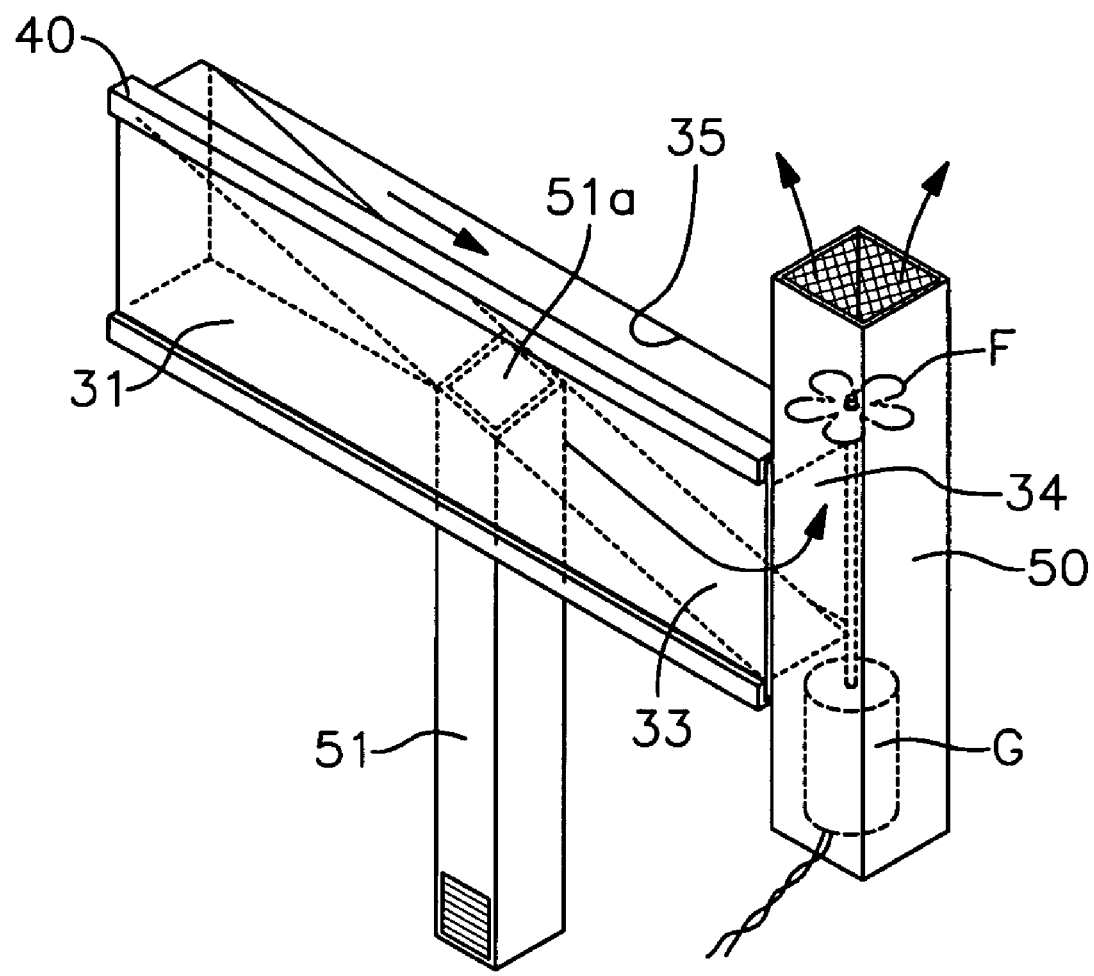
FIG. 9 is a perspective view of one embodiment the ridge beam of FIGS. 8-8A attached to an electricity generating system.
Figure 10:
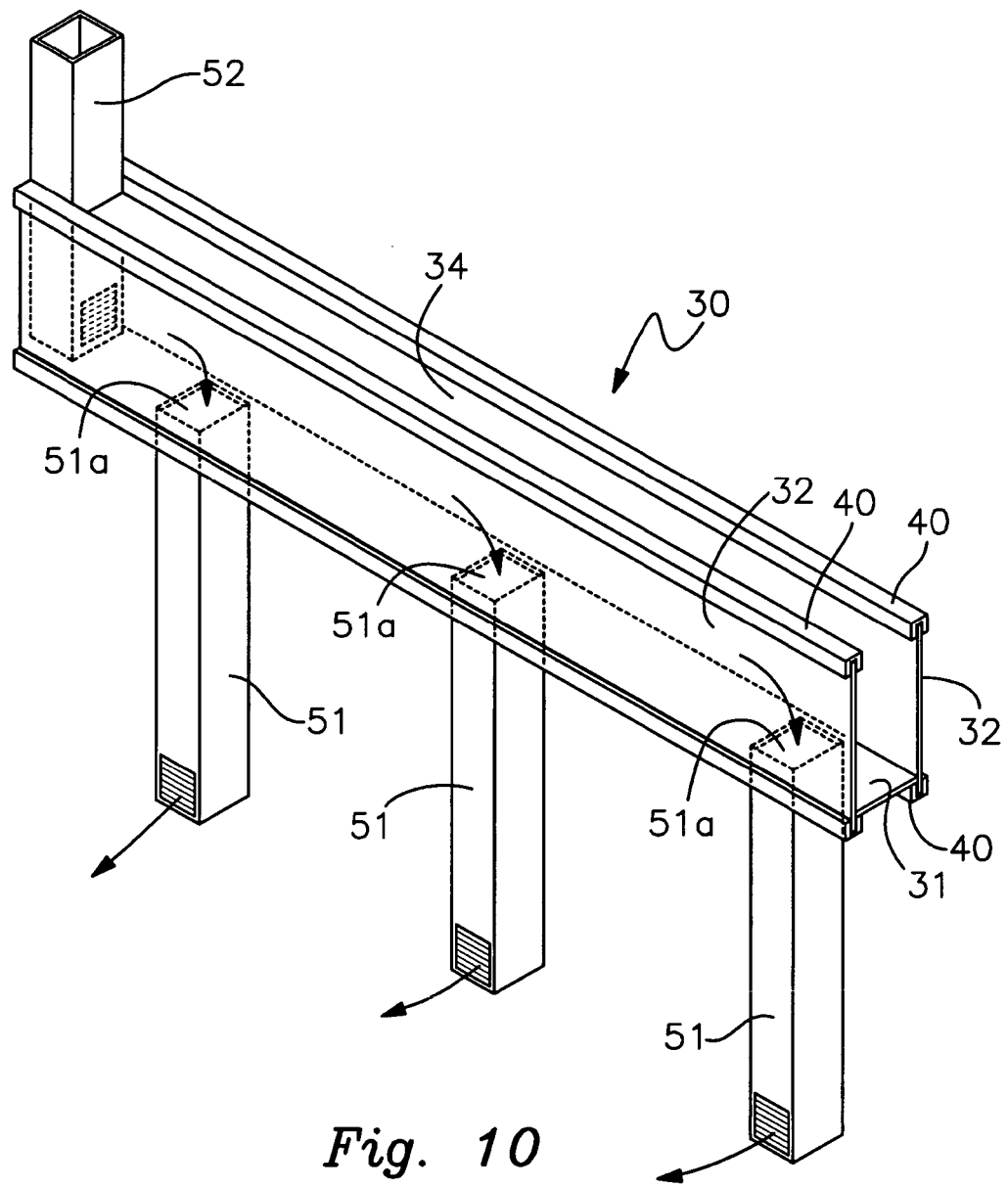
FIG. 10 is a perspective view another embodiment of the ridge beam shown in FIGS. 8-9A secured to a chimney.

FIGS. 1A and 3A are perspective views illustrating schematically one roof panel assembly embodiment 200 of the present invention secured to a building B, and which is shown in greater detail in FIG. 8-10. In this embodiment, the roof panel assembly comprises a horizontal ridge beam 30 which may rest on two or more load bearing columns or walls of the building, or a supportive heat register as shown in FIG. 10. The ridge beam 30 includes a floor 31 and two opposing side walls 32 extending upward from the floor to form an inner channel 34 with opposing terminal ends 36,37 and an open top end 35. As shown in FIG. 8, panels 10 are secured to the ridge beam side walls at one edge R of the panel (R corresponding to the edges 2 or 3, for example, in FIG. 15), such that the lower chambers 16 terminate into the ridge beam side wall 32, as shown. The panel 10 is modified slightly in this roof panel assembly in that the exterior sheet 11 is of the same length as, or slightly longer than, the intermediate sheet 12, the exterior sheet being flush against the ridge beam top cap 36. The top cap 36 may be pitched, as shown in FIG. 8, or have a slight to no pitch, as shown in FIG. 3. The panel is preferably secured to the ridge beam adhesively and/or mechanically fastened angle brackets X, such that the upper chambers 14 are open at the eave edge E and the ridge beam edge R of the corresponding panels, as shown in FIGS. 1A and 8, to allow air entering the roof panel through the eave edge of the panel, to be solar heated, and to travel into the inner channel 34 of the ridge beam 30, as shown by the arrows in FIG. 8. The panels 10 employed in this roof panel assembly embodiment preferably have upper chambers that have a continuous rectangular configuration. As shown in FIG. 8A, the ridge beam 30 preferably includes a sloped rectangular plate 33, extending between the terminal ends 36, 37 of the ridge beam, creating an upper triangular-shaped air plenum 34$a$ through which the air flow is directed. Alternatively, the floor 31 of the ridge beam may be omitted, leaving only the rectangular plate 33 therein (FIG. 8A), or the rectangular plate may be omitted entirely, as show in FIG. 10. Pipes 8 may also be placed within one or more upper chambers of the panels near the ridge beam through which water may be flushed for purposes of fire suppression, for example.

FIGS. 11 and 11A illustrate a preferred design for the ridge beam side walls 32, as shown in FIGS. 8-10. The two opposing side wall 32 are preferably a laminate comprising an outer cover 81 and a core 82 of material comprising fibers, mats, and/or resins. The core material may be wood, fiber or plastic honeycomb, corrugated fiber or plastic, pressboard, laminates, or the like. The preferred core is laminated wood. The outer cover may be a continuously laid or randomly laid veil of fibers and or mats of polyester, glass, and the like. Preferably the material layered upon the inner core comprises is glass fibers 83 arranged in plus and minus 45-degree orientation to the top and bottom edges of the side wall 32; however, it will be appreciated by those of ordinary skill in the art that polyester, aramid, basalt, or other materials may be used in combination with said glass or separately as well as using only glass. Immediately above the bias fibers may be a continuously laid fiber mat of glass or polyester 84. These layers are then infused with a liquid resin that bonds said layers to the core forming a laminated composite. The resins may be polyester, phenolic, polyurethane, vinyl ester, and the like, although the preferred embodiment is polyester. It has been discovered by the inventor that the 45-degree arrangement of fibers in composites used to fabricate the side walls inparts significant improved strength and load bearing properties, which is critical for use in ridge beams of the present invention. The side walls further include top and bottom end caps 40 which may be mechanically and/or adhesively secured thereon or incorporated therein. During the layering and impregnation, the end caps 40 may be attached prior to lamination and impregnation thereby becoming fused into the laminate. The end caps 40 and 40$^1$, by adding vertical and/or horizontal flanges to the inner core, convert the inner core from a sheet into the web of a fabricated I-beam, adding significant improved strength and load bearing properties to the core previously improved.

FIGS. 1A and 9 show the ridge beam attached to hollow vertical member 50 at one of its terminal ends. A hollow vertical member may also be secured to the ridge beam between the terminal ends, as shown in FIG. 1A, for example. In FIG. 1A, the hollow vertical member 50 is a chimney. In FIG. 9, the hollow member includes a fan F secured to an electricity generating alternator or generator G. As air enters into the inner channel 34 of the ridge beam in the direction of the arrows (FIG. 9), the air spins the fan F, which in turn activates an electricity generating alternator or generator G attached thereto. A heat register 51 may be secured beneath the ridge beam to direct the flow of heated air therethrough via opening 51$a$.

FIG. 10 illustrates the incorporation of an ozone generator, particulate filter, ultraviolet light, electro-static plates, or other air purification system 52 within the ridge beam, such that air flowing through the ridge beam inner channel 34 may be treated by this air purification system. While any air purification system known by those of ordinary skill in the art may be employed, a preferred system comprises ozone with a maximum concentration of 0.050 parts per million.

Figure 2:
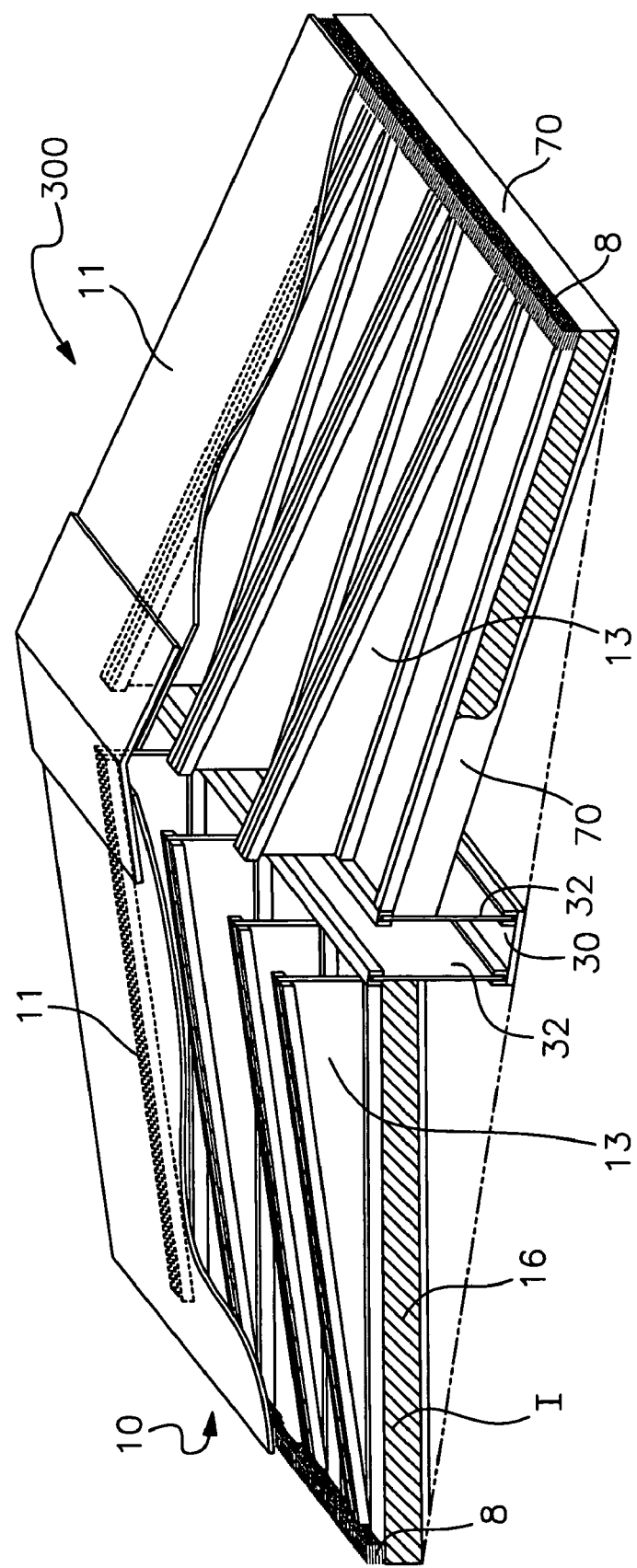
FIG. 2 is a front perspective view of an embodiment of the inventive roof panel assembly designed to retrofit an existing building roof.
Figure 2A:
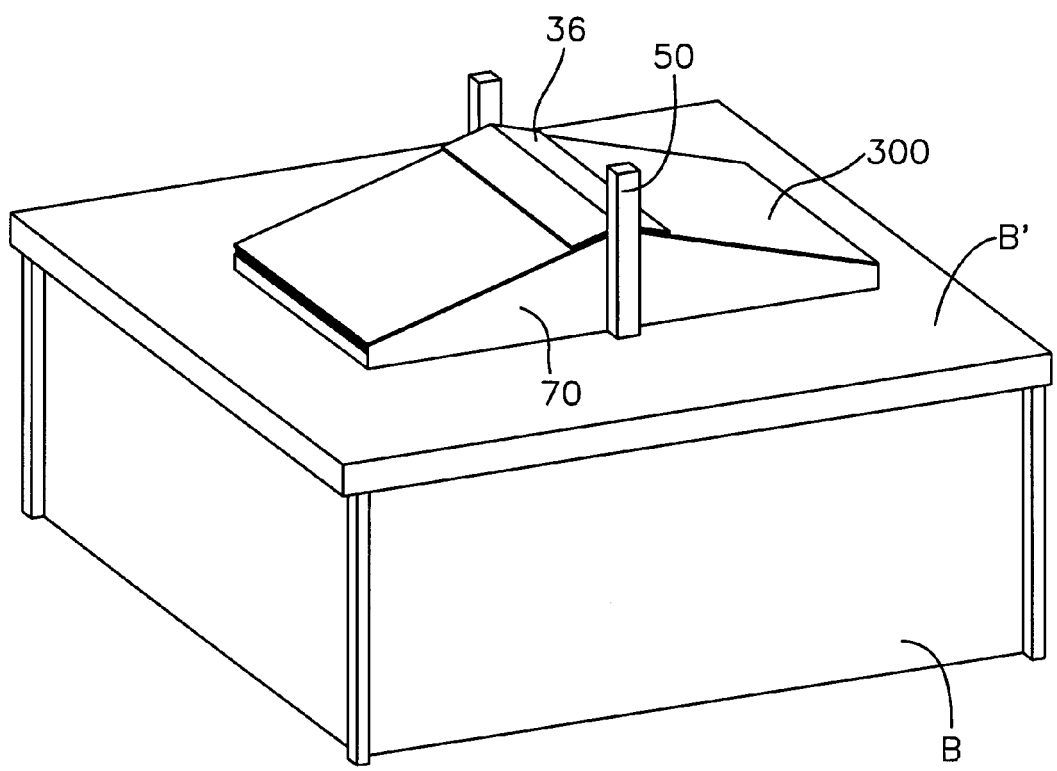
FIG. 2A is top perspective view showing the roof panel assembly of FIG. 2 attached to an existing building roof.

FIGS. 2-2A represent a roof panel assembly 300 similar to that shown in FIG. 8, for example, but which is a retrofit design for attachment upon an existing flat building roof. The panels 10 of this design include an exterior sheet 11, intermediate sheet 12, and interior sheet 15, creating upper 14 and lower 16 chambers, as described above. However, for improved air flow, the upper chamber is tapered increasingly up from the smaller eave edge E of the panel to the larger ridge beam edge R of the panel, thereby increasing the volume of the chamber 14 from the eave edge to the ridge beam edge of the panel. This tapered configuration of the upper chamber 14 serves to accommodate the increase in volume of the heated air as it picks up additional heat from the radiant barrier as it flows within the upper chamber 14 of the panel prior to communicating with the inner channel 34 of the ridge beam 30. This tapered configuration of the upper chamber may be achieved by using tapered I-beams 13$^1$ illustrated in FIGS. 2 and 16-17, which have a tapered web 13$b^1$. The T-shaped cap 13$a^1$ of the I-beam may be mechanically and/or adhesively secured to the web 13$b^1$, or the entire piece maybe molded as one solid piece in a conventional composite process as described above. The web 13$b^1$ portion of the tapered I-beam may be formed of a laminate shown in FIG. 11A and described above with respect to the preferred construction of the ridge beam side walls 32. The exterior sheets 11 of the panels are secured to the ridge beam top cap 36 of the ridge beam assembly, as described above for the assembly shown in FIG. 8. The exterior sheet may of the same length or shorter than the length of the underlying intermediate sheet. As shown in FIG. 2A, the retrofit roof panel assembly 300 is secured to the existing roof conventional flat roof B$^1$ of a building B, unlike the assembly 200, which functions as the building's primary roof, and serves to absorb and divert heated air away from, or into, the underlying building roof, as described above for the earlier described roof panel assembly 200. The roof panel assembly 300 may also be secured to chimneys 50 as described above.

FIG. 1B illustrates the use of the inventive panels in a roof assembly 600 designed to rest upon existing trusses T of the underlying building B. Here, two panels 10 are secured to another on each side of a ridge beam top cap 36$a$, as described for the earlier embodiments. The adjacent panels along each side of the roof assembly 600 are secured to one another by tabs mechanically and or adhesively fastened from the webs of all the vertical members shown in FIG. 15 forming the side walls of the lower chambers 16 of the adjoining panels, as discussed earlier. The tabs are, in turn, adhesively and/or mechanically fastened to the immediately adjacent webs forming the side walls of the abutting panel. A section of the roof panel (not shown) is removed to access and mechanically fasten side walls of the two adjacent panels, which are arranged along each side of the building such that the upper and lower chambers extend from the eave edge E to the ridge beam R edge of the respective panels FIG. 3 illustrates another embodiment of the inventive roof panel assembly 400 which is very similar to the assembly 200 shown in FIG. 8, but having a very minimal roof pitch. Here, the top cap 46 of the ridge beam assembly has a minimal pitch, but like the other embodiments, is secured to the exterior sheets of the underlying roof panels 30. The roof panels engaged therein also preferably have an upper chamber that is tapered from the eave edge E to the ridge beam edge R, as shown in FIG. 3. The same ridge beam 30 may be employed as per the roof panel assemblies 200, 300 described above. In this embodiment, the roof panel assembly 400 utilizes the same panels as described above for roof assemblies 200, 300, including the tapered upper chambers that open from the eave edge E of the panels to the ridge beam edge R of the panels and preferably includes bags of insulation I within or forming one or more of the lower chambers, as shown in FIG. 3. The same ridge beam 30 may be employed as described above. The roof panel assembly 400 rests upon standard supports 102 and columns 101 commonly used as rafters, joists, perlins in metal buildings or in post and beam structures as present in the underlying building B.

Figure 4:
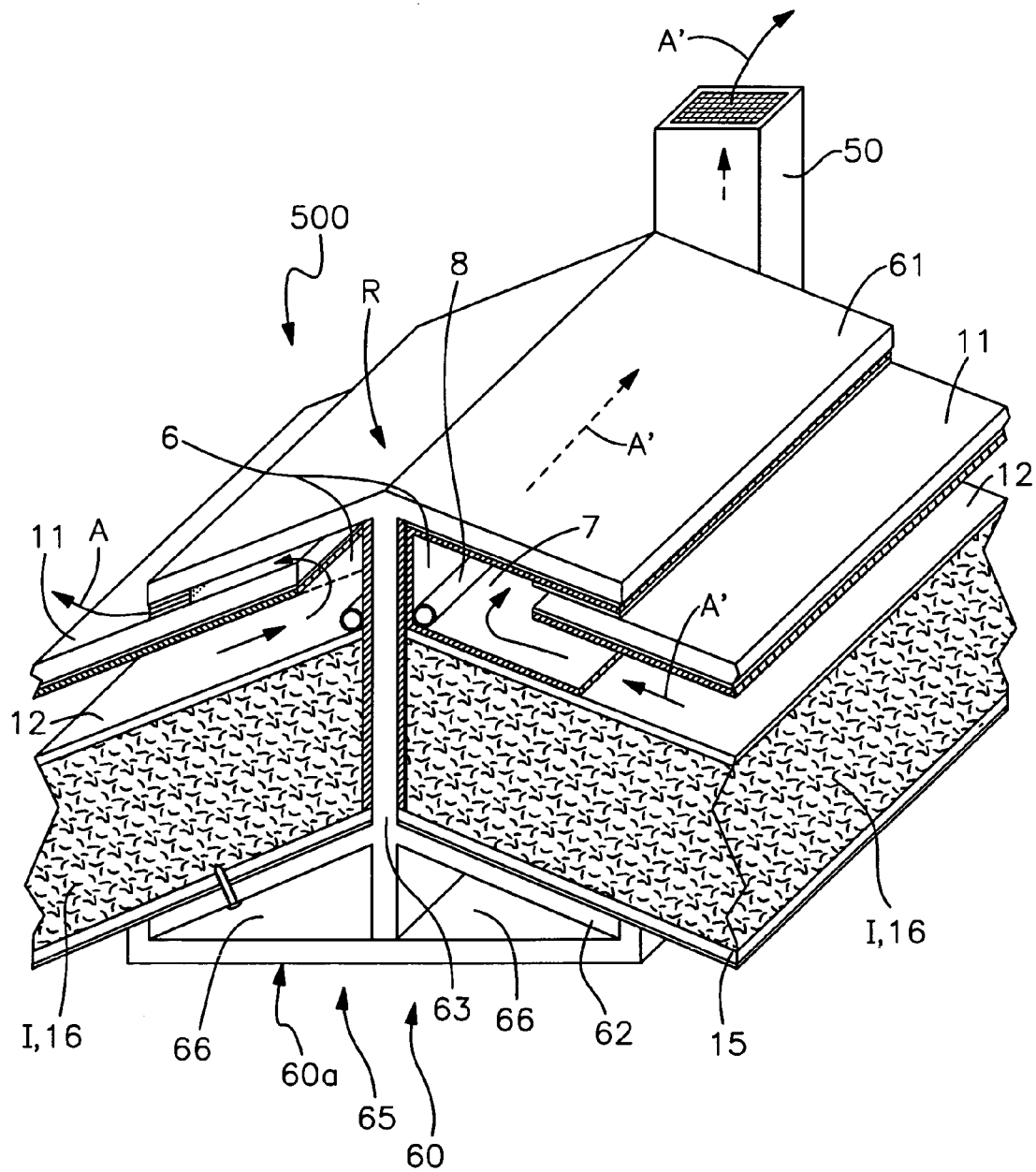
FIG. 4 is a sectional view of another embodiment of the inventive roof panel assembly.

FIG. 4 illustrates another embodiment of the inventive roof panel assembly 500, using the same panels 10 as described above, with minimal modifications, and a different ridge beam assembly 60. In this embodiment, the ridge beam assembly 60 comprises a pitched top portion 61 and a pitched lower portion 62 secured to one another by a central web 63 extending vertically from the peak of the top portion and perpendicularly to the lower portion of the ridge beam assembly to create opposing sockets 64 configured to receive the uppermost edges of opposing roof panels 10. In this embodiment, the panels 10 are secured within the sockets adhesively and/or mechanically, the roof panel 10 fitting into the socket formed within the ridge beam as shown in FIG. 15, for example, such that the upper chambers are open from the eave edge E (not shown in FIG. 4) of the panels to the ridge beam edge R, as shown in FIG. 4. The upper channels of the panels are not necessarily tapered, as are the embodiments shown in FIGS. 2 and 3, for example; however, the exterior sheets 11 are preferably shorter in length than the underlying intermediate sheets 12 in order to create a gap 6 therebetween to allow air traveling (in the direction of the arrows A) form the exterior of the roof via the eave edge of the panel assembly toward the ridge beam edge R, exiting the panel assembly through a vent 5 secured between the top cap 61 and the exterior sheet 11 of the panel.

The right-hand side of the roof panel assembly 500 shown in FIG. 4 illustrates another means for securing the panels to the ridge beam assembly wherein the exterior sheet 11 is secured directly to the underside of the top cap 61, thereby creating a seal therebetween. Here, the air travels in the direction of arrows $A^1$ through a chamber 7 created therein. Alternatively, the air may be diverted to the interior of the building, or used to activate an electricity generating alternator or generator, as described for other embodiments herein. A pipe 8 may also be employed within the upper chambers for flushing water therethrough to flood the upper air chambers 14 and create a curtain of water raining from the eave edges as a water barrier to mitigate the effects of an approaching fire, for example. As discussed above, the intermediate sheets 12 of the panels are preferably formed of weather resistant, including water resistant, composite materials so that any underlying insulation, sound attenuation materials, heat absorbing materials, fire proofing materials, and the like do not become damaged by the water. It will be recognized by those of ordinary skill in the art that the embodiment shown in FIG. 4 has been illustrated to show two different embodiments of the panel orientation within the ridge beam assembly, namely the embodiment shown on the right hand side of the figure wherein the exterior sheet of the panel is sealed directly to the top cap 61, while the embodiment on the left hand side of the figure, showing the use of a vent 5 and gap 6 for the diversion of air outside of the panel. However, it will be recognized that both sides of the roof panel assembly may be identical or switched from what is illustrated herein.

The ridge beam assembly shown in FIG. 4 includes a lower cap 65 integral with the lower portion 62. In this embodiment, the cap includes two chambers 66 within which cables and wires (not shown) may be run. The underside of the cap 60a may have attached to it lighting fixtures, fans, and the like (not shown).

FIG. 18 shows a ridge beam assembly for accommodating roofs having different pitches. In this embodiment, the roof assembly includes a T-shaped ridge beam 90 having a horizontal top portion 91 secured to central web portion 92 extending vertically downward, such that the central portion bisects the top portion of the ridge beam as shown. A pair of upper wedges 94, 95 of desired angles are secured to the flanges of the horizontal top portion 91 of the ridge beam. Preferably, the wedges are each one continuous piece extending from the front terminal end of the ridge beam to the rear terminal end of the ridge beam. Lower wedges 96, 97 of desired pitches are secured to the flanges of the lower horizontal portion 93 of the ridge beam, as shown. The lower and upper wedges have slopes that match the desired pitch of the panels of the roof assembly as well as the pitch of the angles 98 attached to the top of the underlying walls W of the building. Preferably, the angles attached to the top of the wall are each one continuous piece extending from the front terminal end of the ridge beam to the rear terminal end of the ridge beam. The panels P may be the conventional roof panels, or more preferably, the panels of the present invention adhesively and or mechanically joined. A tie beam (not shown) may be used to attach the underside of one inventive roof panel to an opposite inventive roof panel as is commonly practiced in the art.

As discussed above and illustrated herein, if desired, one or more chimneys may be attached to the various roof panel assemblies of the present invention at various heights to boost the acceleration and speed of the heated air being exhausted through the chimney. It is generally known that the height of the chimney has an effect on the draft it creates—the higher the chimney, the lower the pressure above the chimney which draws the air up the chimney, in addition to the temperature differential and volume of the hot air exhausting from the air plenum. Most chimneys are built with a cross section size 1/10 the size of the open area of the air inlet and with a height of 13 to 18 feet or higher if surrounded by hills, trees, or lakes. Exhaust vents in the ridges of roofs generally have a combined cross section three times greater than the air inlet vents under the eaves. The embodiments of the present invention which incorporate the use of chimneys can control the temperature and velocity of the air generated within the inventive roof panel designs by controlling the dimensions of the chimneys. The air velocity is accelerated through a combination of sizing the inlet air at the roof edge, the solar heat available at the location where the roof is installed, the area of roof being heated, the cross sectional size of the interior air channels, the inside diameter of the insulated chimney, and the chimney height. The optimum velocity of the chimney air for current technology of micro or nano electricity generating turbines is from 9 to 25 feet per second which can be created by a combination the abovementioned factors. It will be appreciated by those of ordinary skill in the art that a variety of combinations is possible and can be optimized to meet the needs for each latitude and longitude location, ambient temperatures, sun inclination, interior and exterior temperature differentials, and days of sunlight. In the case of a subtropical environment as exists in Southwest Florida, for example, the ratio of the inlet air to outlet air should be approximately 1:3, the ridge beam having a cross sectional area of approximately 2 square feet, the diameter of the chimney approximately 12 inches, and the height of the chimney approximately 6 feet above a roof pitch of 4 in 12 with air chambers ¾ inches tall and 24 inches wide, in an array of 20 such chambers along both roof panels 40 feet long.

Figure 7:
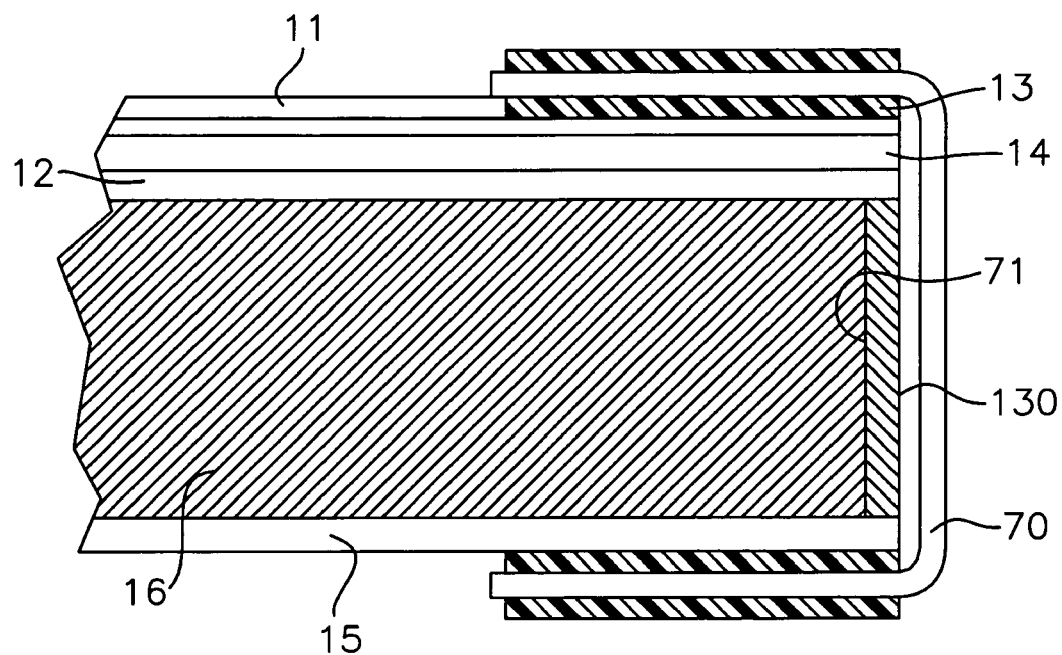
FIGS. 7 and 7A show an exemplary cap for sealing the ends of the inventive roof panels.
Figure 7A:
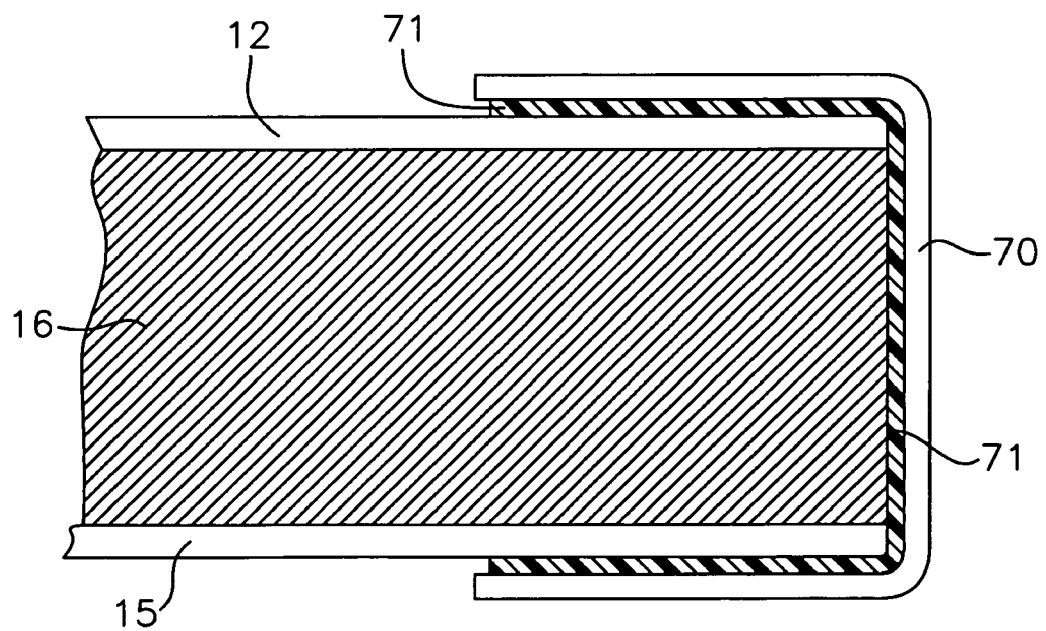

In all of the roof panel assembly embodiments, it is preferable to provide a sealing end cap 70 along the ends of the rear and front panels comprising the particular roof panel assembly. The end caps run parallel with the outer-most vertical support members 13 of the panels from the interior sheet to the exterior sheet of the panel, as shown schematically in FIG. 2A, for example. Sealing end caps are also provided along the edges of the panels on each side of the ridge beam assemblies, but only extend from the interior sheet of the panel to intermediate sheet of the panel, thereby sealing and protecting from the moisture, debris, and pests, the lower chambers of the panels, and leaving open the upper chamber of the panels. As described above, vents 8 are provided along the eave edge E of the panel assembly to prevent the entry of debris and pests within the upper chambers. An exemplary sealing end cap is that shown in FIGS. 7 and 7A. The end cap is a C-channel member 70, which in FIG. 7A, is shown secured to the edges of a panel at vertical support member 130, from the interior sheet 15 to the intermediate 12 sheet of the panel to seal the lower chamber, leaving the exterior sheet and upper chamber (not shown in FIG. 7A for ease of illustration) uncovered so air may flow therethrough. The same end cap may be secured to the ends of the panel at vertical support members 13, 130 to seal the panel from the interior sheet to the exterior sheet on each end, as shown in FIG. 7. Preferably, an adhesive sealant 71, such as polyurethane, is used to form a tight seal between the end cap and panel. Polyurethane or other adhesive sealants may be employed in the present invention wherever a sealant is desired between panel and ridge beam components.

Figure 5A:
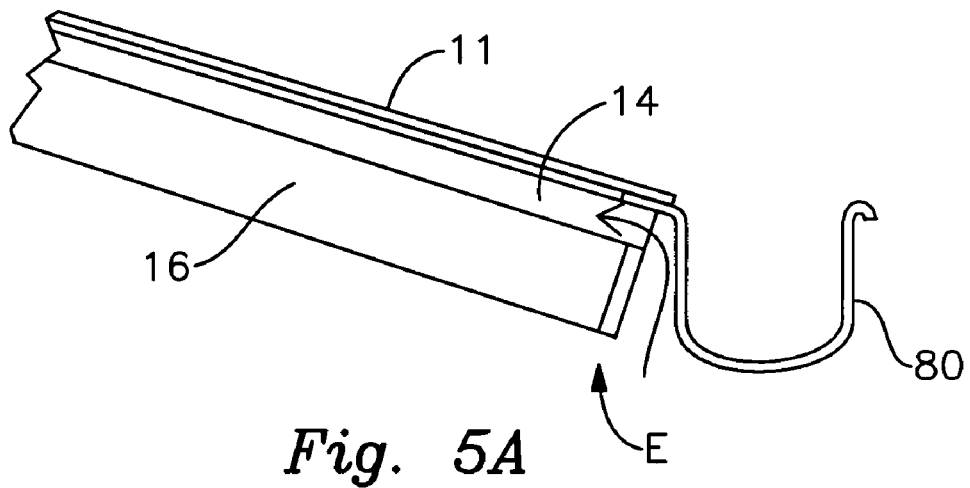
FIG. 5A is a side sectional view of the inventive panel showing one attachment of an eave gutter thereon.
Figure 5B:
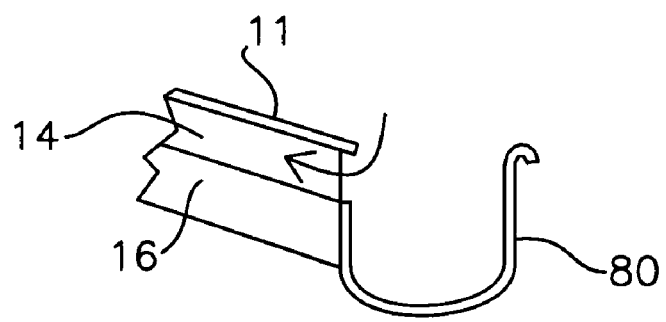
FIG. 5B is a side sectional view of the inventive panel showing a second attachment of an eave gutter thereon.

As shown in FIGS. 5A and 5B, a gutter 80 may be secured to the eave edge E of the roof panel assemblies of the present invention. As shown in FIG. 5A, the gutter 80 may be secured just above the upper chamber 14 or as shown in FIG. 5B, the gutter 80 may be secured just beneath the upper chamber 14.

Figure 12:
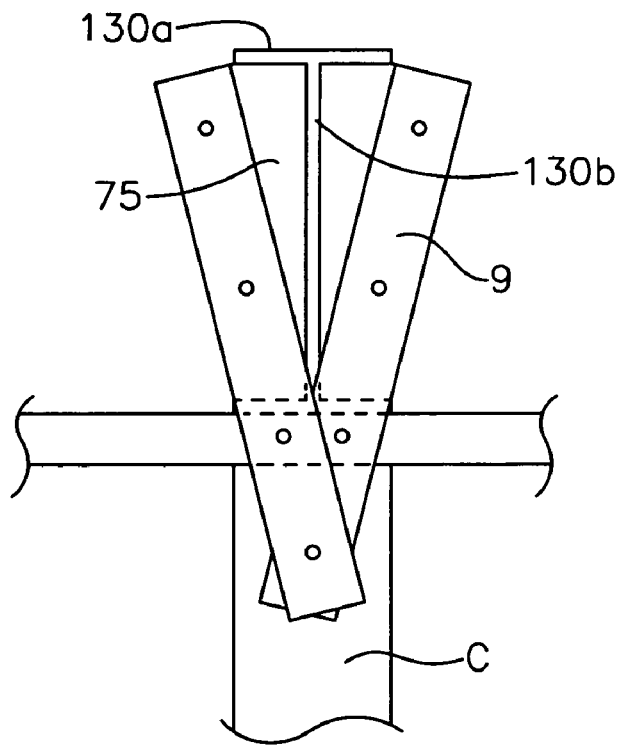
FIG. 12 is an eave view of the roof panel assembly showing the strapping of the roof panel assembly to an underlying column where the eave is flush with the column.
Figure 12A:
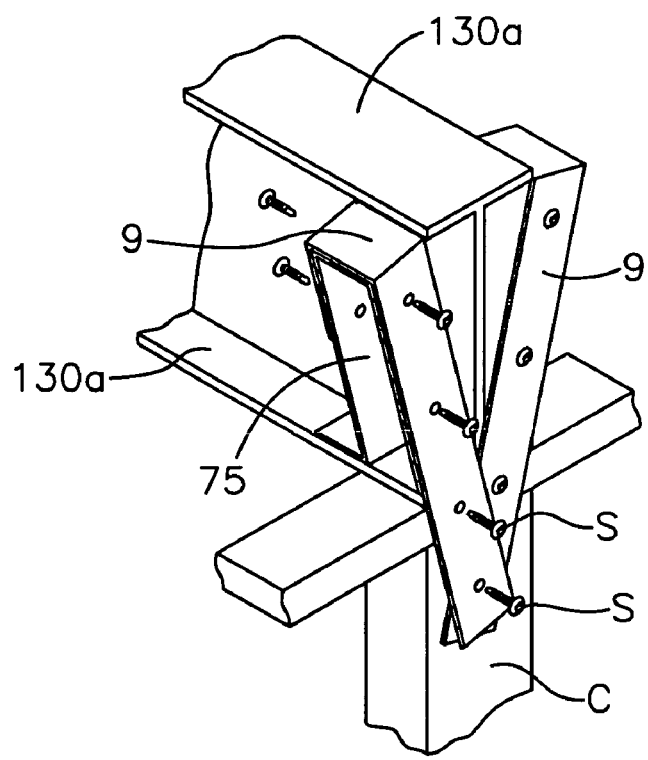
FIG. 12A is a side perspective view of the strapping configuration shown in FIG. 12.
Figure 13:
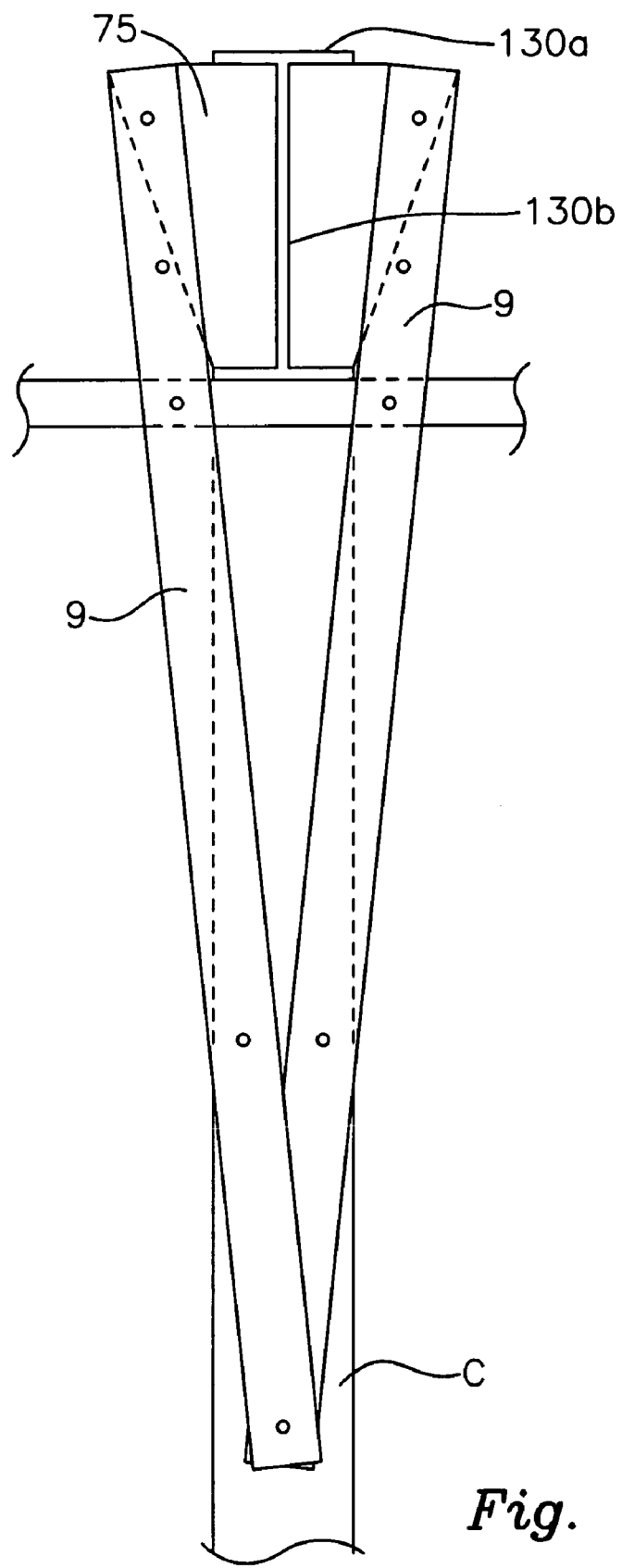
FIG. 13 is a front view of the roof panel assembly showing the strapping of the roof panel assembly to an underlying column where the eave edge of the panel extends beyond the column as an overhang, as shown in FIG. 6.

FIGS. 6-6A and 12-13 illustrate means for securing the eave ends of the roof panel assemblies to an underlying building column C. Prior to placing the roof component to the underlying wall, a wedge angle 76 may be secured to the top end of the underlying column or two of the supporting walls to accommodate the downward angle of the panel of the fully assembled roof component. The inventive angle brackets 75 are secured upon the flanges 130a of an I-beam used as the vertical support member of the panels. The angle bracket may be secured to the flange via adhesive and/or a screw S or other mechanical fastening means as shown in FIG. 6. A strap 9 formed of a fiber or steel, for example, is secured along the back of the angle bracket 75 as shown in FIGS. 6A and 13 for roof panel assemblies wherein the eave edge overhangs the underlying column C. Here, as further illustrated in FIG. 13, the straps 9 cross around the lower extended I-beam flange portion 130b. FIGS. 12-12A illustrate a strapping configuration wherein the I-beam does not overhang the column C, but instead the I-beam is cut flush with the underlying column C.

The invention claimed is:

1. A roof panel for use in constructing buildings, said panel comprising:
   a) an exterior sheet and an intermediate sheet subjacent said exterior sheet, said sheets secured to one another by a first set of spaced apart vertical support members, each of said vertical support members extending, in parallel with one another, from an eave first edge to a ridge beam second edge of said panel, and wherein said sheets, in combination with said first set of vertical support members, form a series of upper chambers therebetween;
   b) an interior sheet subjacent said intermediate sheet, said intermediate sheet secured to said interior sheet by a second set of spaced apart vertical support members, each of said second set of vertical support members extending, in parallel with one another, from said eave first panel edge to said ridge beam second panel edge, and wherein said sheets, in combination with said second set of vertical support members, form a series of lower chambers therebetween; and
   c) said eave edge and said ridge beam edge having a sufficient opening to allow heated air to flow unidirectionally therethrough within the panel;
   and wherein said upper air chamber has a continually tapered configuration beginning at said eave edge and increasing to said ridge beam edge of said panel.

2. The roof panel of claim 1, wherein said exterior sheet is formed of, coated with, or layered by, a solar heat absorbing material.

3. The roof panel of claim 1, wherein said panel further has at least one vent positioned near one of said edges between said exterior and intermediate sheets to prevent the entry of debris and pests therein when said panels are secured to a building.

4. The roof panel of claim 1, wherein said vertical support members are formed of composite materials.

5. The roof panel of claim 1, wherein said vertical support members are formed of a metal or metal alloy.

6. The roof panel of claim 1, wherein said vertical support members are formed of wood laminates.

7. The panel of claim 1, wherein said panel has opposing side ends configured for interlocking engagement with adjacent panels to form a contiguous building roof, wherein one of said opposing side ends is a female socket joint and a second opposing end is a male socket joint configured to engage within said female socket joint of said adjacent panel.

8. The panel of claim 1, wherein said vertical support members are I-beams.

9. The panel of claim 1, wherein said exterior sheet comprises a top layer and a radiant barrier layer secured beneath said top layer.

10. The panel of claim 1, wherein at least a portion of said panel chambers have a material coated thereon, layered therein, filled therewith, or secured thereto, said material selected from the group of insulation materials, fire proofing materials, sound attenuation materials, heat absorbing materials, and armor.

11. The panel of claim 1, wherein at least a portion of said exterior sheet is includes a solar panel for generating electricity within said upper chambers.

12. The panel of claim 1, wherein at least a portion of said exterior, intermediate, and interior sheets includes at least one translucent or transparent section for admitting light through said panel.

13. The panel of claim 1, wherein at least a portion of said exterior, intermediate, and interior sheets, include a solar collector for distributing sunlight throughout said panel.

14. The panel of claim 1, one or more of said upper or lower chambers comprises water bladders for heating water within said chambers, said bladders further including a water inlet secured to a water tube and a water outlet secured to a second tube.

15. The roof panel of claim 1, wherein said exterior sheet has a shorter length than said intermediate sheet to form a gap between said sheets near said first edge of said panel.

16. The roof panel of claim 1, wherein said upper chamber contains at least one pipe for distributing water.

* * * * *